United States Patent
Nishimori et al.

(10) Patent No.: US 6,663,483 B2
(45) Date of Patent: Dec. 16, 2003

(54) COLD AND HOT AIR BLOWING DEVICE FOR CONSTRUCTION MACHINERY

(75) Inventors: Hiroyuki Nishimori, Tsuchiura (JP); Tadashi Hiyama, Niihari-gun (JP); Takeshi Ishizuka, Tsuchiura (JP); Seiji Ojima, Mito (JP); Tsuyoshi Sakyou, Niihari-gun (JP); Susumu Sasaki, Adachi-ku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/169,673

(22) PCT Filed: Nov. 6, 2001

(86) PCT No.: PCT/JP01/09672
§ 371 (c)(1),
(2), (4) Date: Sep. 26, 2002

(87) PCT Pub. No.: WO02/36893
PCT Pub. Date: May 10, 2002

(65) Prior Publication Data
US 2003/0100256 A1 May 29, 2003

(30) Foreign Application Priority Data
Nov. 6, 2000 (JP) ........................................ 2000-337901

(51) Int. Cl.$^7$ ................................................. B60H 1/34
(52) U.S. Cl. ...................................... 454/155; 454/306
(58) Field of Search ................................ 454/152, 155, 454/286, 306, 319, 320

(56) References Cited

U.S. PATENT DOCUMENTS

| | | | | |
|---|---|---|---|---|
| 791,397 A | * | 5/1905 | Asbury | 454/306 |
| 5,044,259 A | * | 9/1991 | Catan et al. | 454/306 |
| 5,238,452 A | * | 8/1993 | Levy et al. | 454/306 |
| 5,358,444 A | * | 10/1994 | Helm et al. | 454/306 |
| 5,643,080 A | * | 7/1997 | Kondoh et al. | 454/155 |

FOREIGN PATENT DOCUMENTS

| | | |
|---|---|---|
| JP | 06-56167 | 4/1994 |
| JP | 2000-094956 | 4/2000 |
| JP | 2000-096619 | 4/2000 |
| JP | 2000-096621 | 4/2000 |

* cited by examiner

*Primary Examiner*—Harold Joyce
(74) *Attorney, Agent, or Firm*—Crowell & Moring LLP

(57) ABSTRACT

To provide a cold/warm air outlet assembly for construction a machine, said assembly being capable of fully meeting desires on the comfort of a working environment of an operator under air conditioning and use of air conditioning for a multiplicity of purposes, an upper outlet tube 2 and lower outlet tube 3 are formed into substantially tubular shapes having conical circumferential walls with walls, through which air outlets 20,30 are formed, being included as tilted walls. The upper outlet tube 2 is resiliently fitted and connected to the lower outlet tube 3, and the lower outlet tube 3 is resiliently fitted and connected to a vertical part 11a of an air conditioner duct 11. The upper and lower outlet tubes 2,3 are, therefore, turnable in horizontal direction at their connected parts. By operating air-direction control knobs 24,34 arranged in the air outlets 20,30 directed toward desired turned positions, the vertical directions of the internal fins $21_1$–$21_3$,$31_1$–$31_3$ can be adjusted to cause cold/warm air to blow out in the desired directions, respectively.

6 Claims, 26 Drawing Sheets

F I G. 1 (b)
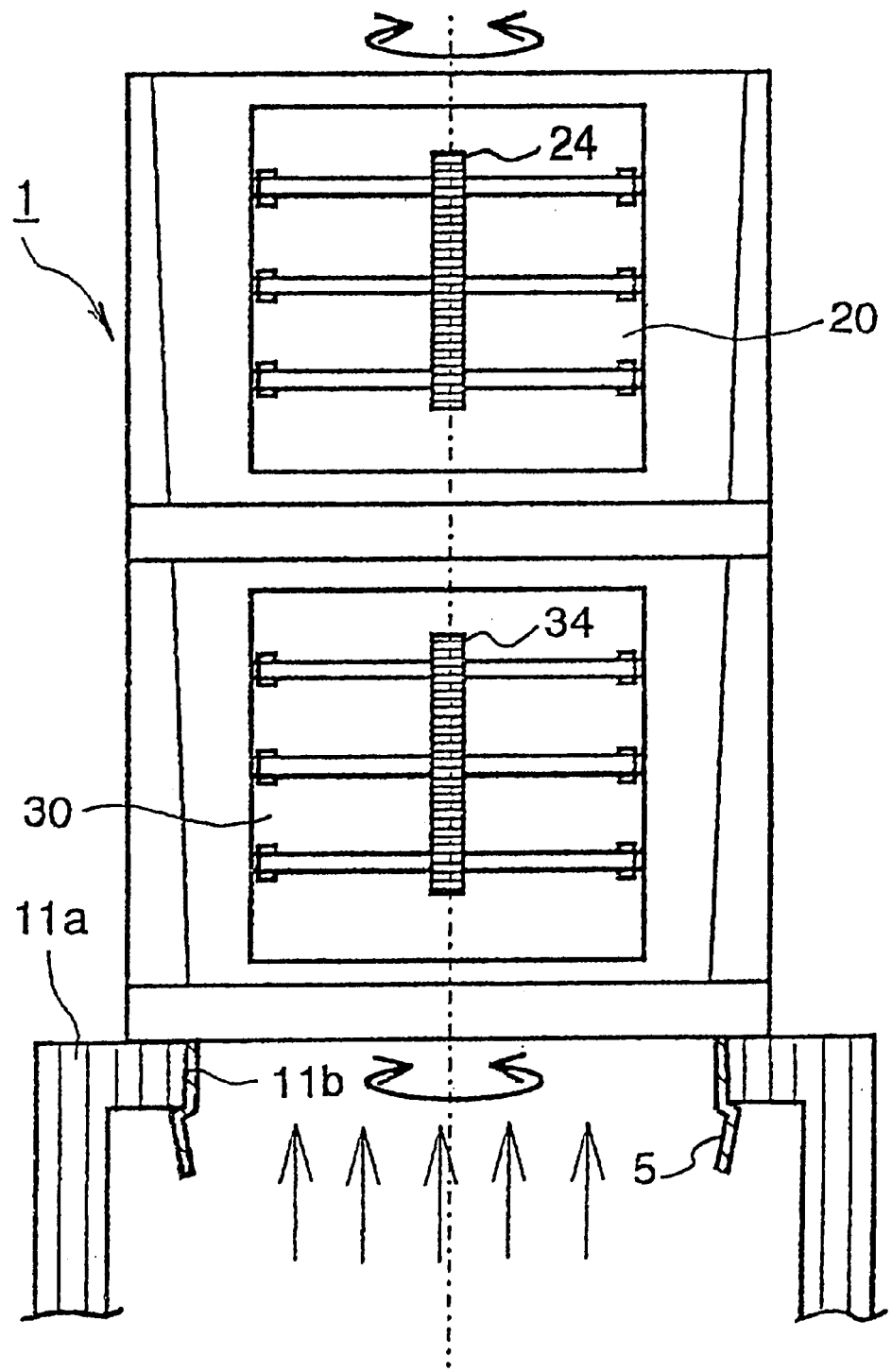

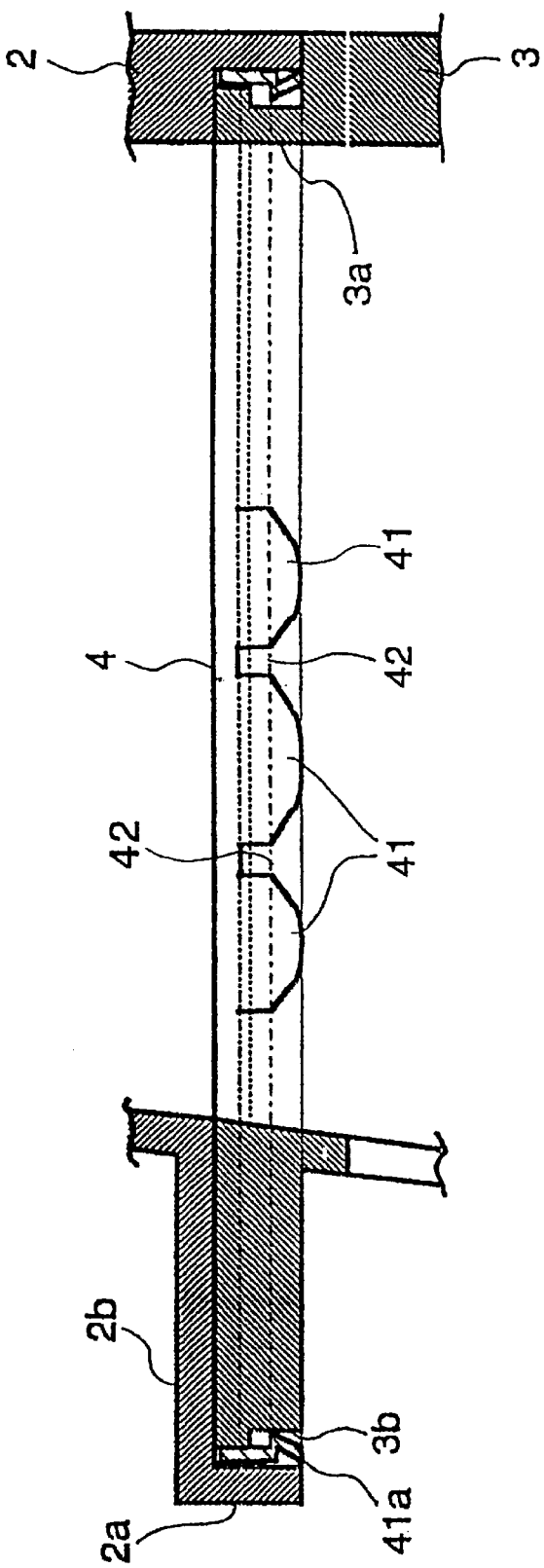

F I G. 4 (a)
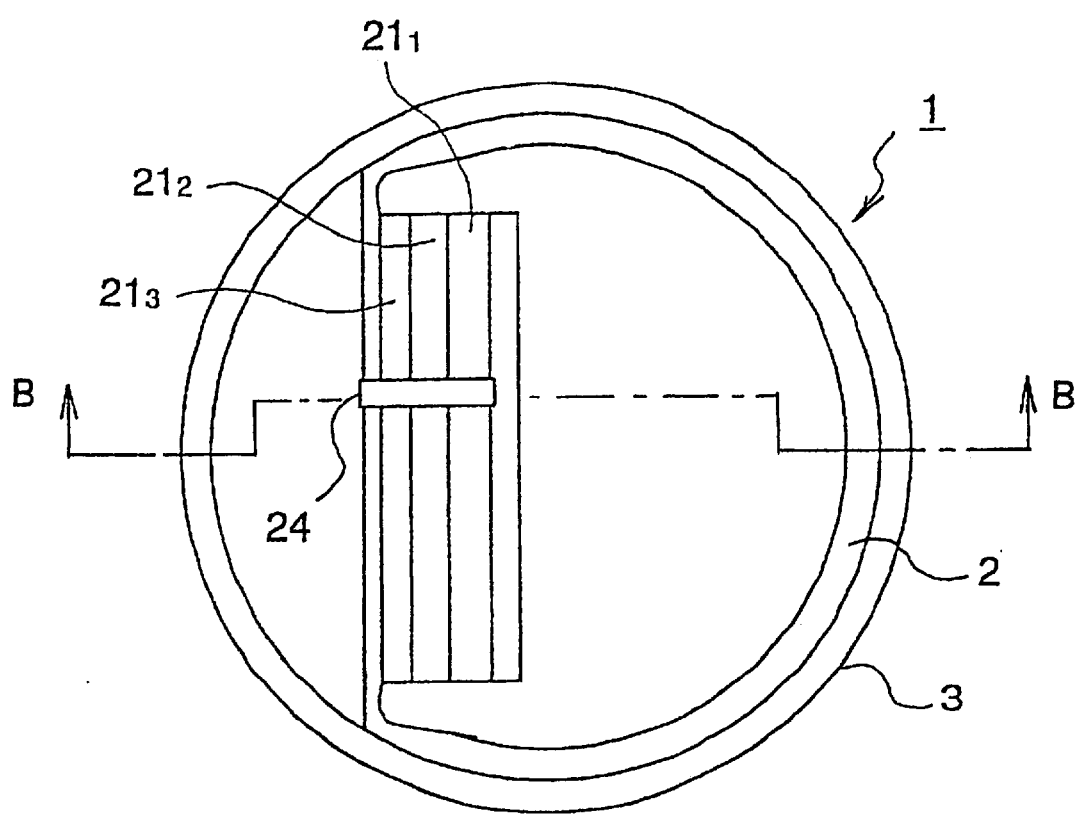

F I G. 6(a)
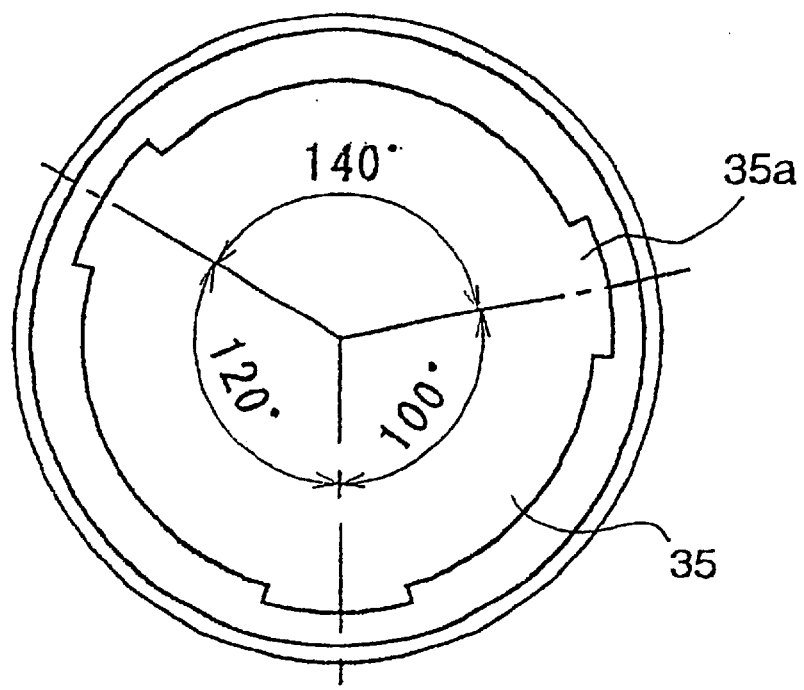
F I G. 6(b)
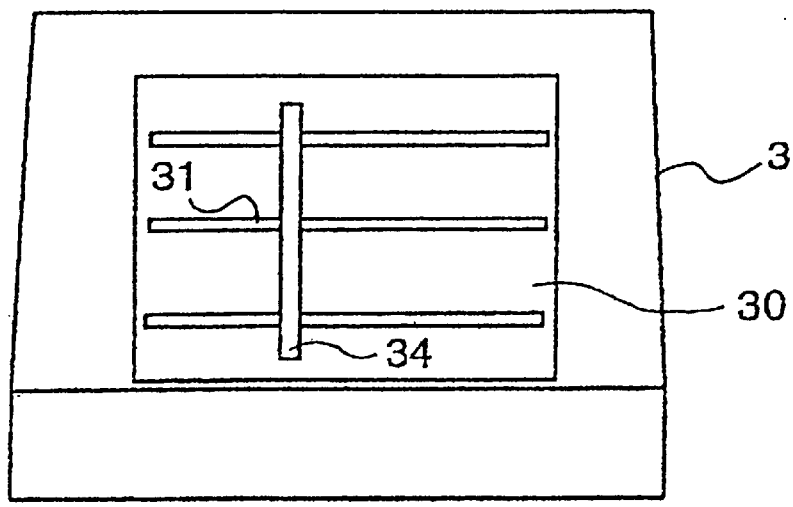

F I G. 7(a)
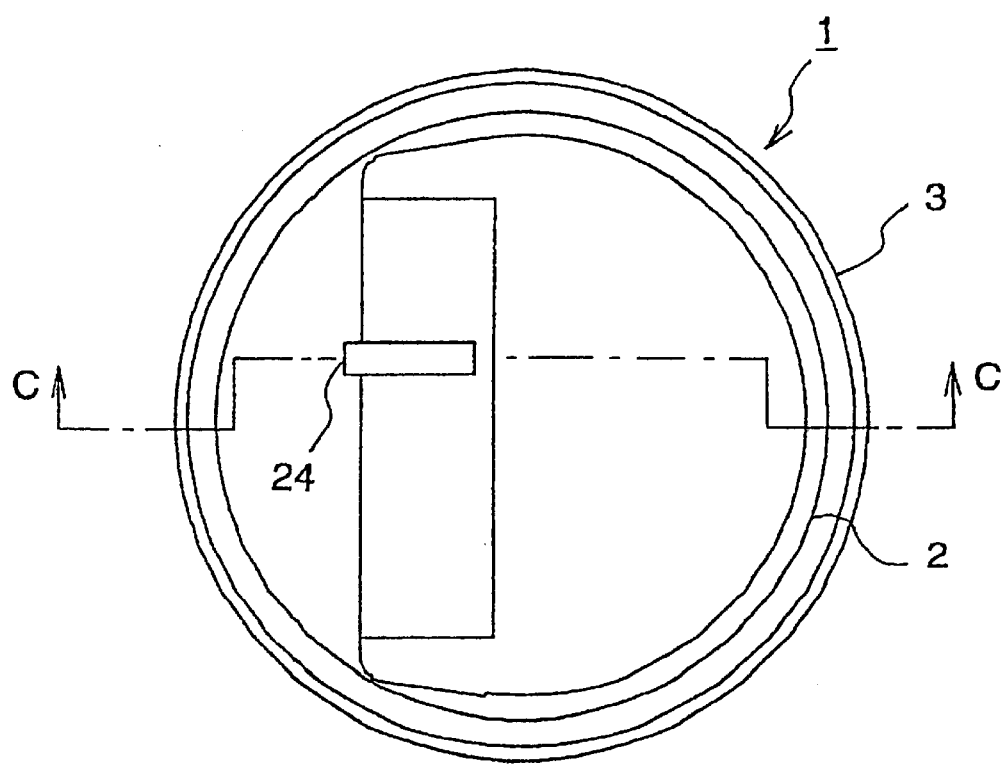

F I G. 8(a)
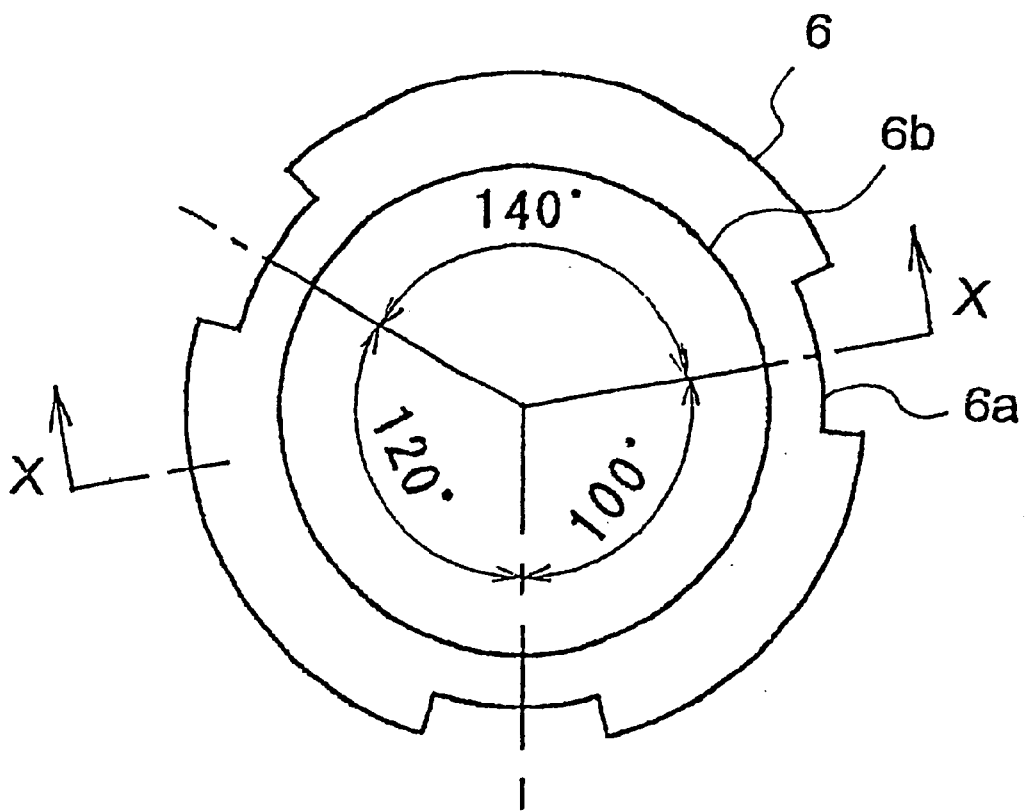
F I G. 8(b)

F I G. 1 4
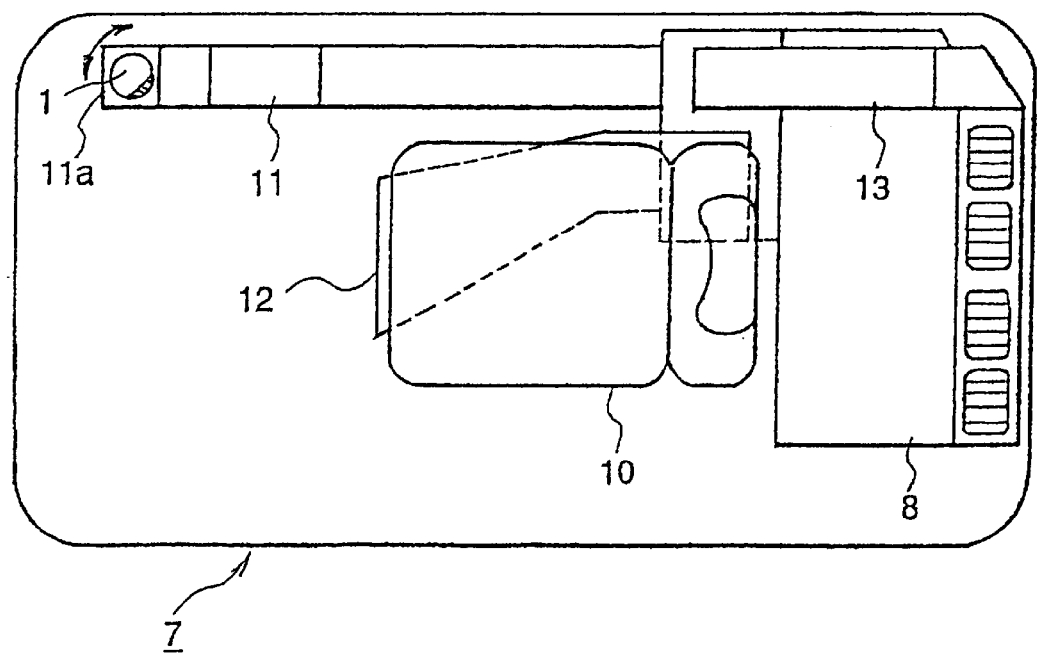

F I G. 1 6
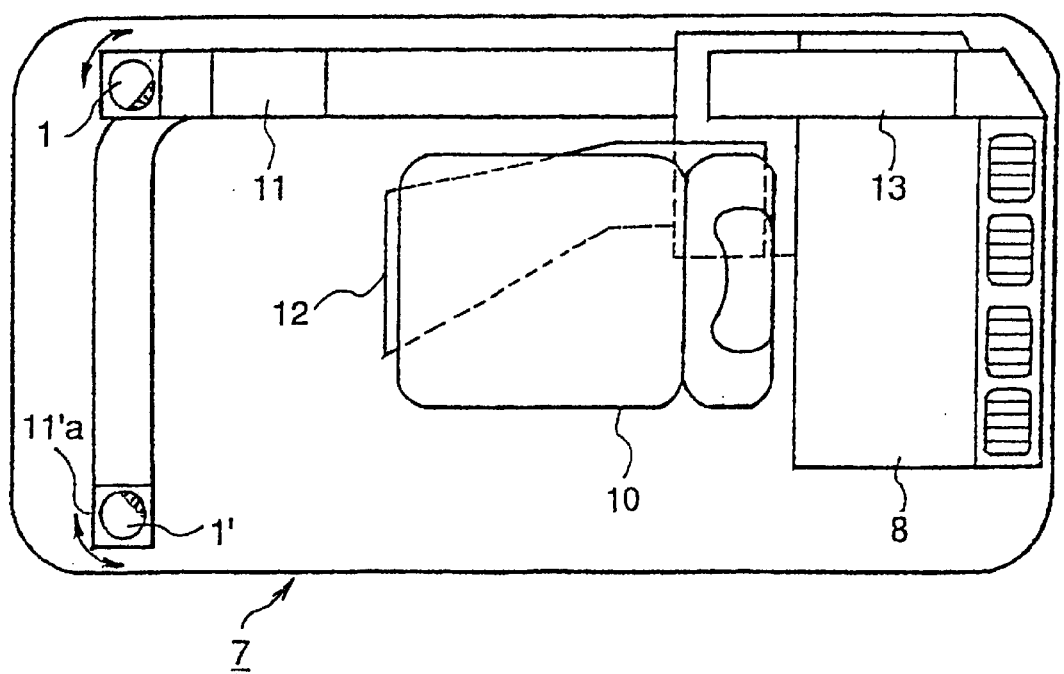

COLD AND HOT AIR BLOWING DEVICE FOR CONSTRUCTION MACHINERY

TECHNICAL FIELD

This invention relates to a cold/warm air outlet assembly for an air conditioner. The cold/warm air outlet assembly is to be mounted on a vertical part of an air conditioner duct which is arranged extending upward in a front corner part of a cab of a construction machine such as a hydraulic excavator.

BACKGROUND ART

In a construction machine such as a hydraulic excavator, a cab is in a closed state surrounded at four sides and a ceiling thereof with glass plates, steel plates and/or the like to permit performing construction work even in severe weather environments such as rain, strong winds and snow. In construction work under the blazing sun in midsummer, the interior of the cab in the closed state becomes considerably hot so that an operator of the construction machine is forced to work under severe conditions. Due to severe heat, the operator may suffer from dehydration in some instances. JP 8-175156 A, for example, discloses an invention on an air conditioner duct for a hydraulic excavator, which comprises three ducts extending from an air conditioner arranged on a floor behind an operator's seat, one having a cold air outlet opening in an upper rear part of the operator's seat, another having a cold air outlet opening near a foot area below the operator's seat, and the remaining one having a cold air outlet opening on a forward outboard side of the operator's seat.

The air outlet opening on the forward outboard side of the operator's seat has a shape formed by cutting off a side wall of an air outlet member which is in an upwardly tapered, substantially conical shape. The air outlet member is turnably supported on a vertical part, which is arranged on an upstream side and extends in a vertical direction, so that the air outlet opening can be directed in a desired direction in a horizontal plane. Inside the air outlet opening which opens in a somewhat upward direction, plural fins are connected together in parallel by connecting rods. By manipulating a knob connected to the fins, the fins can be adjusted in an interlocked stepless manner into a direction ranging from an upward direction to a downward direction. As a consequence, the blowing direction of cold air can be set in any desired vertical direction.

In a construction machine, such as a hydraulic excavator, with a heavy machine mounted thereon, a glass window covering the front of a cab is arranged as wide as possible, generally extending over the entire area of the front such that construction work can be performed while fully watching and confirming the state of operation by a bucket, which is arranged on a free end portion of the heavy machine to perform loading of earth or sand, the ground, the working locations of workers, and the like. When the sun shines into the cab from the front in summer, the sunlight enters from an upper front through the front glass window and the strong sunlight impinges primarily on the chest to feet of the operator. To begin construction work under the strong sunlight in summer, the operator often presets the temperature of the air conditioner at a rather low level and its air volume at a maximum level and, when the cab has become cool subsequent to performing work for a while, resets the preset temperature and air volume to appropriate values. These values are automatically controlled in the case of an air conditioner of the type that the room temperature and air volume are automatically controlled.

According to the above-mentioned conventional technique, the direction of a cold wind blowing out of the air outlet can be set in desired vertical and horizontal directions by turning the air outlet member as desired and controlling the knob in the air outlet. If no sufficient refreshing feeling is available only with cold air from the air outlets arranged in the upper part behind the operator's seat and near the foot area, respectively, the operator generally sets the direction of the air outlet of the air outlet member such that the air outlet is directed toward his face or chest, and then performs work. In this case, the operator's face and chest against which cold air is directly blown are cooled to such extent that he feels sufficiently cool. However, the lower half of the operator's body such as the femoral and pelvic regions, against which cold air does not blow directly and only a wraparound wind blows indirectly, is exposed to the impinging sunlight and is heated by radiant heat. The operator, therefore, cannot enjoy much comfort. After the temperature of the cab has dropped to such extent as the operator feels cold, the operator can feel comfortable for the first time.

As the lower half of the operator's body, said lower half being exposed to cold air only indirectly even after the temperature in the cab has changed to a stable level, tends to feel hot, the operator has a tendency to set the cooling temperature of the air conditioner at a rather low level so that the temperature in the cab may often be lowered beyond necessity. If the operator adjusts the knob at the air outlet to direct the cold air toward the lower half of his body with a view to avoiding such a problem, the temperature of the upper half of his body, such as his face, is not lowered, thereby not only failing to obtain comfort but also possibly overcooling the abdominal region so that the operator may feel unwell. This problem is not limited to the time of working in a cooled environment in summer, but a similar situation also arises when working in a heated environment at the time of a cold weather such as winter.

When the humidity is high as in the rainy season or when the exterior temperature is low as in winter or the like, dew may be formed on the front glass window to cloud the same. To demist the front glass window, the operator may direct the air outlet member toward the front glass window to blow cold air or warm air against the front glass window. During this demisting period, cold air or warm air is blown only indirectly against the operator so that the operator cannot feel comfortable. Depending upon the convenience in proceeding with work, the operator may have to proceed with the work while consulting with workers working around the construction machine with an egress/ingress door, which is located in a side wall of the cab, kept open. In such a case, it is also necessary to direct the air outlet member toward an exit/entrance to shut off warm air or cold air which would otherwise enter through the exit/entrance. This leads to an inconvenience that a stream of air-conditioned air does not blow against the operator.

As the direction of cold or warm air blown out of the air outlet can be set in a desired direction in the conventional art, the comfort of the operator's working environment under air conditioning can be satisfied accordingly. Nonetheless, the conventional art is not fully satisfactory in the comfort of a working environment under air conditioning especially in the hot or cold season or when air conditioning is used for a multiplicity of purposes, because cold or warm air cannot be blown in a different direction concurrently with maintaining the operator's whole body at a comfortable temperature or blowing cold or warm air against the operator.

The present invention has been completed with a view to overcoming such inconvenience in the conventional art, and has as an object the provision of a cold/warm air outlet assembly for a construction machine, which can fully meet desires for the comfort of a working environment of an operator under air conditioning and use of air conditioning for a multiplicity of purposes.

DISCLOSURE OF THE INVENTION

To solve the above-described problems, the present invention is characterized in that a plurality of air outlets are arranged in a vertical direction of a casing to be mounted on a vertical part of an air conditioner duct, and directions of cold/warm air blowing out of the respective air outlets can be independently set in a vertical direction and a horizontal direction. Preferably, the casing may comprise a group of plural small casings stacked in the vertical direction such that the small casings are slidingly turnable in a horizontal direction relative to each other, and the small casings are each provided with at least one air outlet formed therethrough. A circumferential wall of the casing is constructed of a conical or upwardly tapered tubular member. A restrictor may preferably be interposed on an upstream side of one of the air outlets, the one air outlet being located on a downstream side, to control a flow rate of the cold/warm air. At least one of the air outlets may preferably be formed through an upwardly-directed, tilted wall which forms at least a part of the circumferential wall of the casing. With respect to each air outlet, plural fins may be arranged turnably about a horizontal rod, and are interlocked by a connecting member which connects the fins together.

BRIEF DESCRIPTION OF THE DRAWINGS

FIG. 1 shows an air outlet assembly according to a first embodiment of the present invention for an air conditioner duct, in which FIG. 1(b) is a front view.

FIG. 2 is an enlarged fragmentary view illustrating a fitted part between an upper outlet tube and a lower outlet tube in FIG. 1(c).

FIG. 4 shows an air outlet assembly according to a second embodiment of the present invention, in which FIG. 4(a) is a plan view.

FIG. 5 shows an upper outlet tube in the air outlet assembly according to the second embodiment of the present invention, in which

FIG. 6 shows a lower outlet tube in the air outlet assembly according to the second embodiment of the present invention, in which FIG. 6(a) is a plan view and FIG. 6(b) is a front view.

FIG. 7 shows an air outlet assembly according to a third embodiment of the present invention, in which FIG. 7(a) is a plan view.

FIG. 8 shows a restrictor plate relating to the third embodiment of the present invention, in which FIG. 8(a) is a plan view and FIG. 8(b) is a cross-sectional view taken along line X—X.

FIG. 9 shows an air outlet assembly according to a fourth embodiment of the present invention, in which

FIG. 10 shows an air outlet assembly according to a fifth embodiment of the present invention, in which

FIG. 14 is a plan view illustrating the air conditioner in the cab of the hydraulic excavator, to which the first embodiment of the present invention has been applied.

FIG. 16 is a plan view illustrating the air conditioner in the cab of the hydraulic excavator, to which the seventh embodiment of the present invention has been applied.

BEST MODE FOR CARRYING OUT THE INVENTION

With reference to the drawings, the embodiments of the present invention will hereinafter be described in detail.

Figure 12:
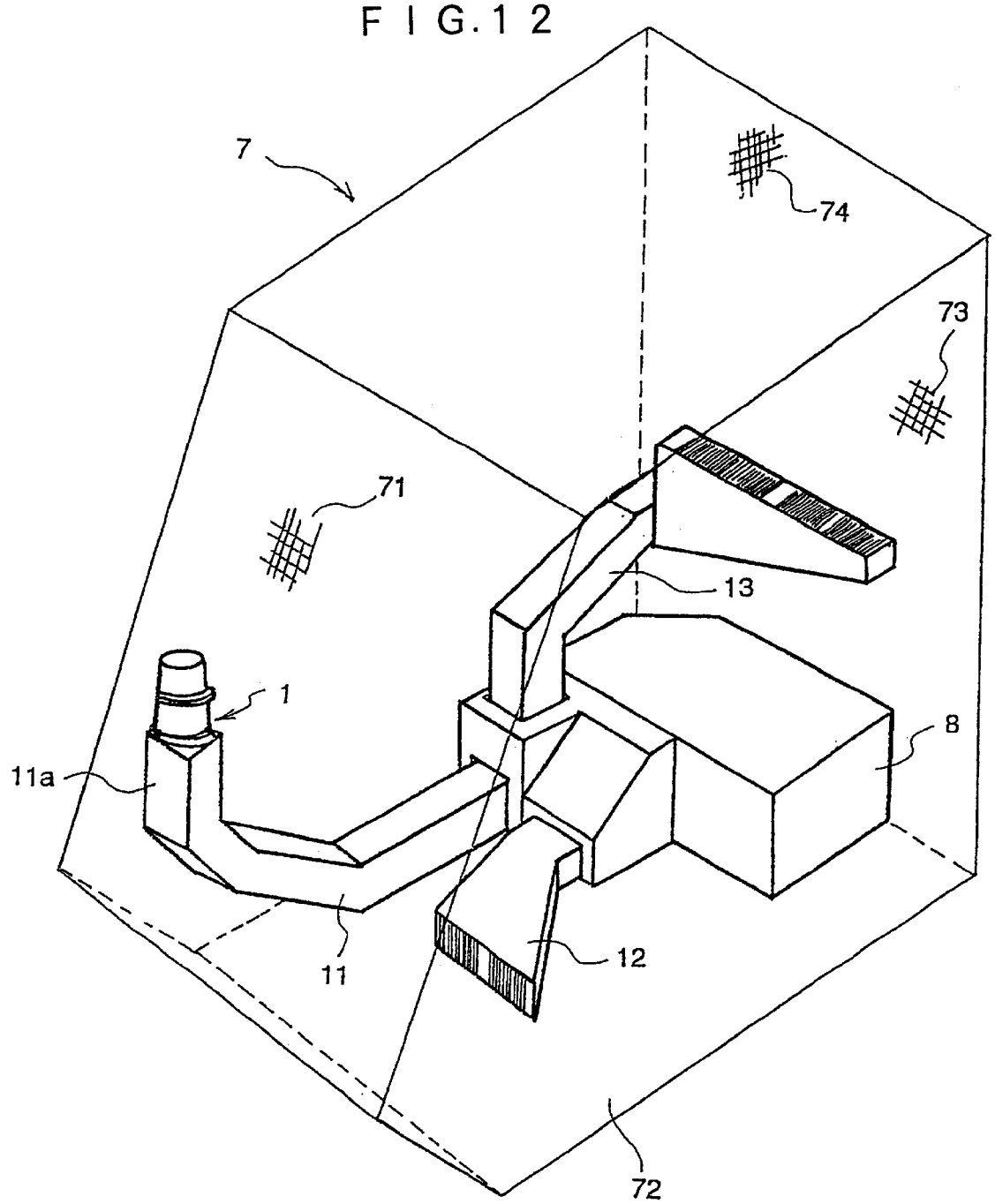
FIG. 12 is a perspective view illustrating in a see-through fashion an air conditioner in a cab of a hydraulic excavator, to which the first embodiment of the present invention has been applied.
Figure 13:
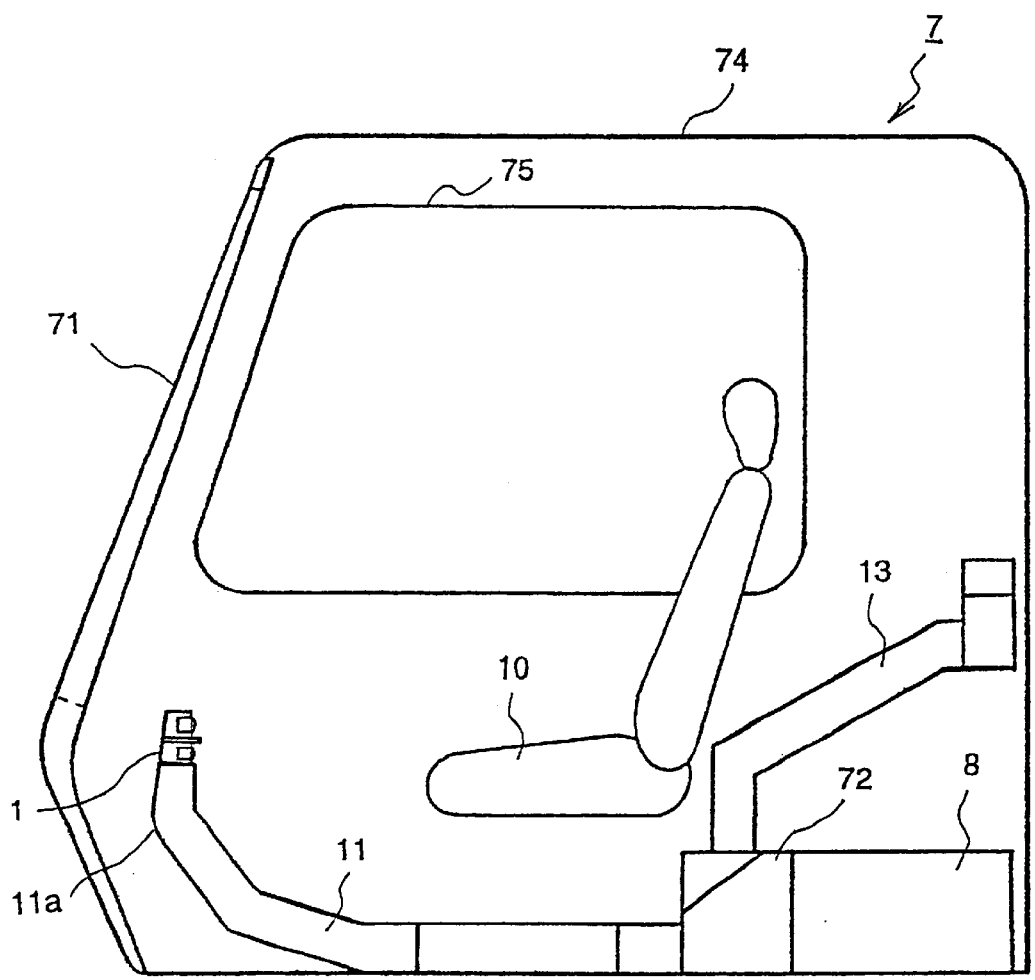
FIG. 13 is a side view illustrating the air conditioner in the cab of the hydraulic excavator, to which the first embodiment of the present invention has been applied.

FIG. 12, FIG. 13 and FIG. 14 are the perspective view, side view and plan view, which illustrate in the see-through fashion the air conditioner in the cab of the hydraulic excavator, to which the first embodiment of the present invention has been applied. These drawings show an air outlet assembly 1 for blowing cold/warm air, which has been delivered from an air conditioner, into a front part of the cab; the cab 7 in which an operator operates the hydraulic excavator; the air conditioner 8 arranged in a rear part of the cab 7; an operator's seat 10 on which the operator sits; air conditioner ducts 11,12,13 for guiding cold/warm air, which has been supplied from the air conditioner 8, forward from a point above a flooring on a right side of the cab 7, forward and downward from a point above a central flooring, and rearward and upward along a right side wall, respectively; a vertical part 11a of the air conditioner duct 11, said vertical part 11a being a part of the air conditioner duct 11 extending forward from the point above the flooring on the right side and extending in a vertical direction in a front right corner and supporting the air outlet assembly 1; an opening 11b opening in a top portion of the vertical part 11a and connected to a bottom part of the air outlet assembly 1; a front window 71 formed of a glass plate substantially covering the front of the cab 7; the flooring 72 covering a floor, left and right side walls; a rear wall 73 covering the rear of the cab 10; a ceiling 74; and a side window 75.

An unillustrated egress/ingress door is arranged in the left side wall as viewed from the operator's seat 10 in the cab 7, and the air conditioner duct 11 which extends toward a front right corner of the cab 7 is arranged at such a position that it does not interfere with an ingress or egress of an operator who is entering or leaving by opening the egress/ingress door. The air outlet assembly 1 arranged on a free end part of the air conditioner duct 1 is to blow cold/warm air directly against the operator, the front window 71 and the like, whereas the air conditioner ducts 12,13 are to blow cold/warm air, which has been supplied from the air conditioner 8, indirectly from a lower part of the cab 7 toward the front and from a rear part toward the-ceiling 74, respectively. The vertical part 11a of the air conditioner duct 11 and the air outlet assembly 1 attached to the upper end of the vertical part are arranged in a lower part of a corner section between the front window 71 and the right side wall 73. The vertical part 11a and the air outlet assembly 1, therefore, do not interfere at all with the operator's view, and further, do not interfere with open/close operation of the front window 71 which is slidably openable and closable in the vertical direction.

Figure 1A:
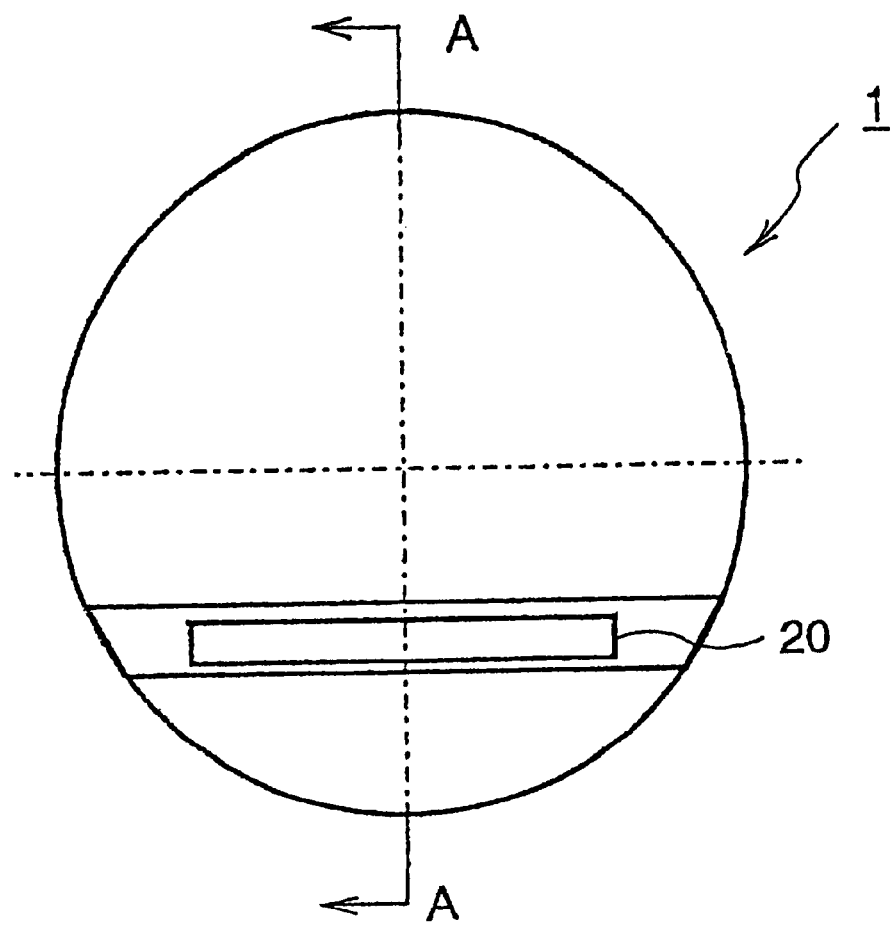
FIG. 1(a) is a plan view.
Figure 1C:
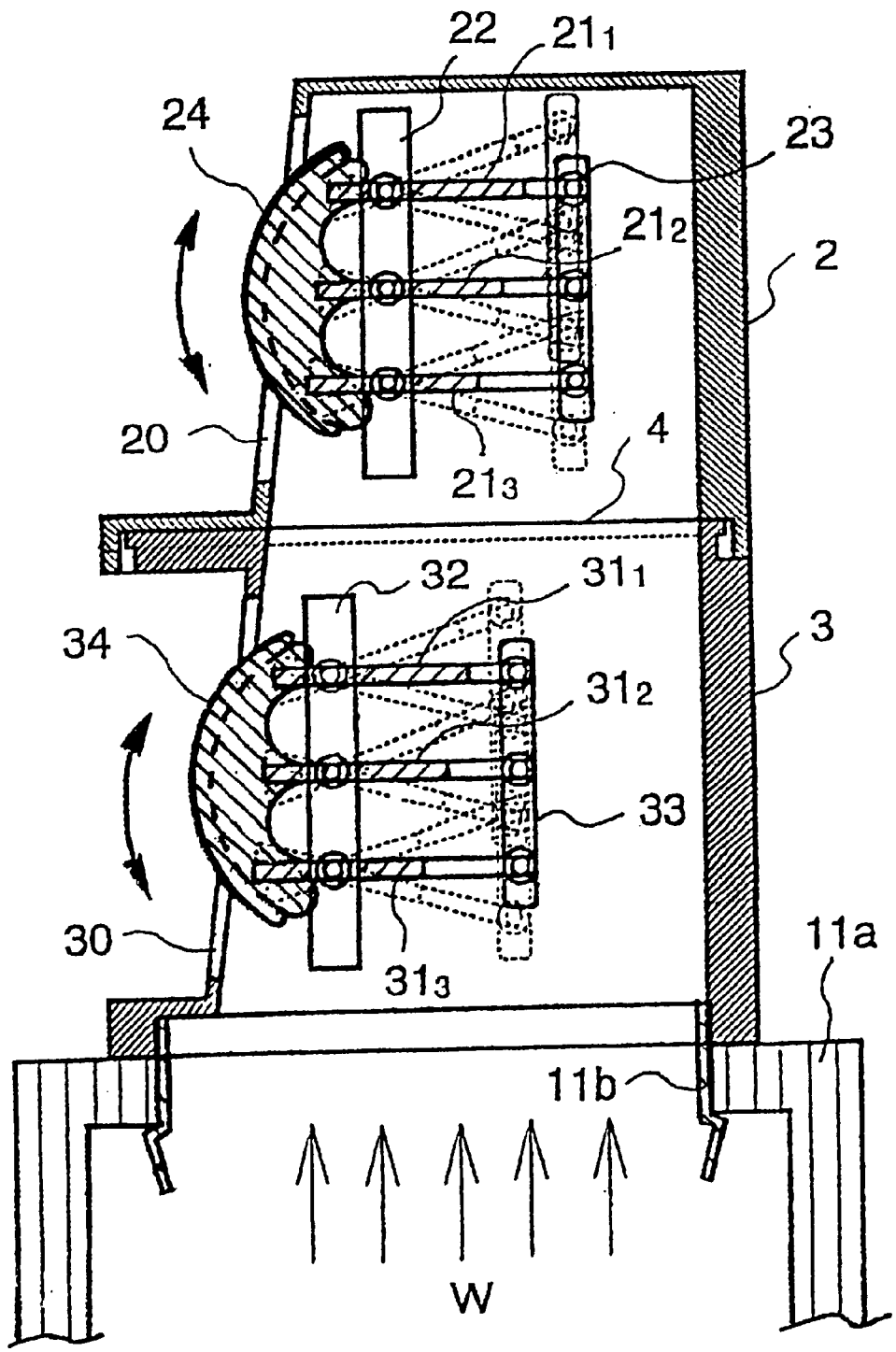
FIG. 1(c) is a cross-sectional view taken along line A—A.

FIG. 1 includes the plan view (a) of the air outlet assembly 1 according to the first embodiment of the present invention arranged on an upper end portion of the air conditioner duct 11, its front view (b), and its vertical cross-sectional view (c) taken along the cutting-plane line A—A in the plan view (a). In these drawings, there are shown an upper outlet tube 2 and lower outlet tube 3 which together constitute the air outlet assembly 1, are in substantially cylindrical shapes having conical circumferential walls, respectively, and include, as tilted walls, circumferential walls in which cold/warm air outlets to be described subsequently herein are formed; the cold/warm air outlets 20,30 formed in the tilted walls of the circumferential walls of the upper outlet tube 2 and lower outlet tube 3, said tilted walls being directed somewhat upward; and fins $21_1$–$21_3$,$31_1$–$31_3$ turnably arranged as sets of 3 fins, one set above the other, inside the upper outlet tube 2 and lower outlet tube 3 at positions facing the air outlets 20,30.

There are also shown brackets 22,32 arranged in pairs in the upper outlet tube 2 and lower outlet tube 3 at opposite sides of the air outlets 20,30, respectively, and turnably supporting the three fins $21_1$–$21_3$,$31_1$–$31_3$ in the upper outlet tube 2 and lower outlet tube 3; connecting rods 23,33 turnablly connected to rear end portions of the three fins $21_1$–$21_3$,$31_1$–$31_3$ with equal intervals therebetween such that the fins $21_1$–$21_3$,$31_1$–$31_3$ are kept in parallel with each other and are interlocked with each other upon turning them; and air-direction control knobs 24,34 fixed to the central fins $21_2$,$31_2$ out of the three fins $21_1$–$21_3$,$31_1$–$31_3$ and operable when an operator wants to turn the fins $21_1$–$21_3$,$31_1$–$31_3$ in a vertical direction to change vertical directions of cold/warm air from the air outlets 20,30.

Figure 3:
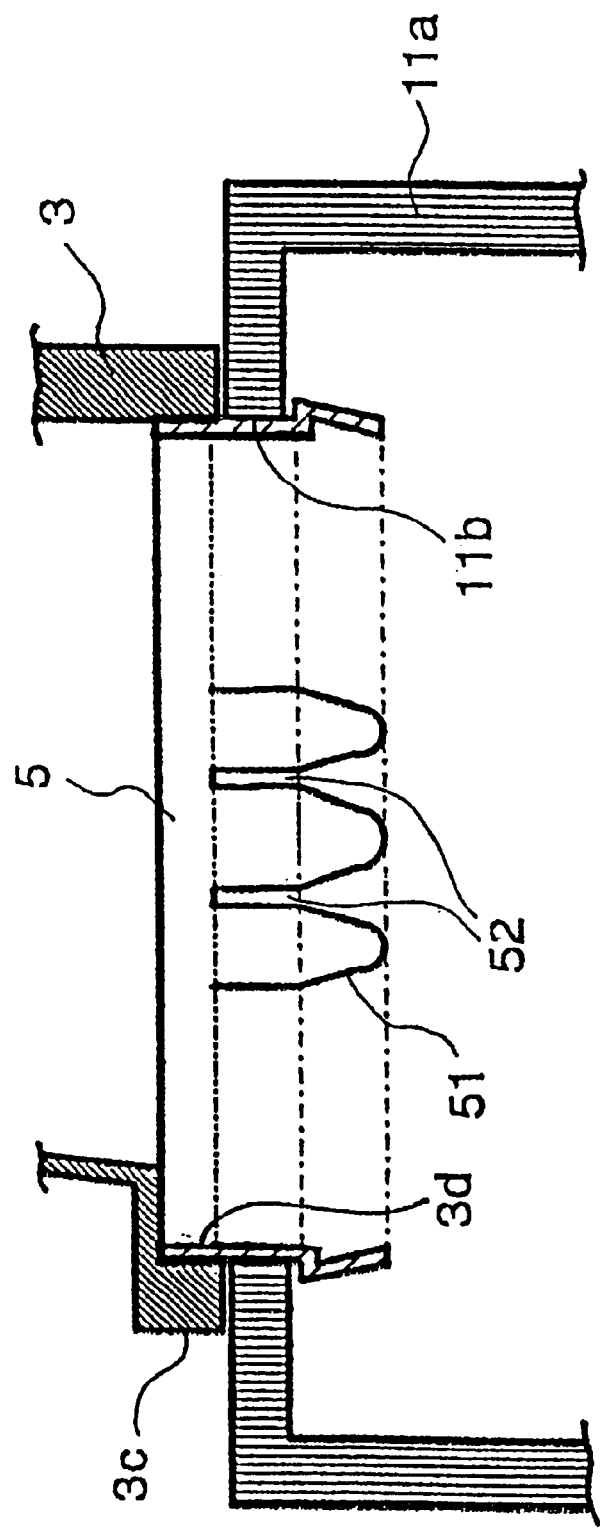
FIG. 3 is an enlarged fragmentary view illustrating a fitted part between a lower outlet tube and a vertical part in FIG. 1(c).

FIG. 2 and FIG. 3 are the enlarged fragmentary views, which illustrate the fitted part between the upper outlet tube 2 and the lower outlet tube 3 and the fitted part between the lower outlet tube 3 and the vertical part 11 in the vertical cross-sectional view (c) taken along the cutting-plane line A—A in the plan view of FIG. 1. In these drawings, there are illustrated an outer flange 2a formed on a lower end of the upper outlet tube 2 such that the outer flange is in a form of a ring of the same diameter as a maximum diameter of the lower end portion of the lower outlet tube 3 and extends in a lateral direction; a collar 2b formed on an upper portion of the outer flange 2a of the upper outlet tube 2 such that an upper surface of the collar lies in a substantially horizontal plane and the collar extends forward from the above-described tilted wall; an inner flange 3a formed on an upper end portion of the lower outlet tube 3 such that the inner flange is in the form of a disk with a diameter slightly smaller than an inner diameter of the outer flange 2 of the upper outlet tube 2 and extends in a lateral direction; a stepped portion 3b formed as a tubular surface of a slightly smaller diameter as a result of a retreat of a lower side of a peripheral end part of the inner flange 3a in a radial direction; an outer flange 3c formed on a lower end portion of the lower outlet tube 3 such that the outer flange 3c has substantially the same diameter as the outer flange 2a and extends in a lateral direction; and a stepped portion 3d formed inside the outer flange 3c such that the stepped portion has a circular circumferential wall of the same diameter as the opening 11b of the vertical part 11a.

Also shown are a synthetic-resin-made locking ring 4, which is resistant to heat and does not undergo thermal deformation, is high in resilience, is in the form of a ring-shaped band and is fixedly adhered on an inner circumferential surface of the outer flange 2a of the upper outlet tube 2; a synthetic-resin-made fitting ring 5, which is resistant to heat and does not undergo thermal deformation, is high in resilience, is in the form of a ring-shaped band, is fixedly adhered on the stepped portion 3d formed on an inner circumferential surface of the lower end portion of the lower outlet tube 3 and has an outer circumferential wall of the same diameter as the opening 11b of the vertical part 11a; claw portions 41 formed by bending a lower portion of the locking ring 4 in a vertical direction, each of said claw portions 41 having a cross-sectional shape in the form of a wedge projecting toward an inner circumference; dividing slits 42 formed at equal intervals in the lower portion of the locking ring 4 to facilitate resilient deformations of the claw portions 41 and dividing the claw portions 41 equally in the circumferential direction; claw portions 51 formed by bending a lower portion of the locking ring 5 in a vertical direction, each of said claw portions 51 having a cross-sectional shape in the form of a wedge projecting toward an outer circumference; and dividing slits 52 formed at equal intervals in the lower portion of the locking ring 5 to facilitate resilient deformations of the claw portions 51 and dividing the claw portions 51 equally in the circumferential direction.

To complete the air outlet assembly 1 and assemble the air outlet assembly 1 onto the vertical part 11a of the air conditioner duct 11, the upper outlet tube 2 is pressed with somewhat strong force into the lower outlet tube 3. The inner flange 3b of the lower outlet tube 3 is thus fitted while outwardly pressing the projections of the claw portions 41 of the locking ring 4. As soon as the inner flange 3b moves past the claw portions 41, the inner flange 3b reaches a position of contact on a back side of the collar 2b and inside the outer flange of the upper outlet tube 2 without any interruption so that by the projections of the claw portions 41, the upper outlet tube 2 is locked turnably in a horizontal direction. When the lower outlet tube 3 is pressed with somewhat strong force into the vertical part 11a of the air conditioner duct 11, the fitting ring 5 adhered on the inner circumferential surface of the outer flange 3c on the lower end portion of the lower outlet tube 3 is fitted into the opening 11b in the vertical part 11a of the air conditioner duct 11 while being subjected to a resilient deformation that the projections of the claw portions 51 are pressed inward. Accordingly, the lower outlet tube 3 is turnably fitted by the projections of the claw portions 51.

After the completion of the air outlet assembly 1 and the assembly of the air outlet assembly on the vertical part 11a of the air conditioner duct 11 are completed as described above, the projections of the claw portions 41 of the locking ring 4 adhered on the inner circumferential wall of the outer flange 2 of the upper outlet tube 2 are allowed to fit in the stepped portion 3b of the lower outlet tube 3 to clinch the inner flange 3b and further, the projections of the claw portions 51b of the fitting ring 5 are allowed to outwardly extend from the lower edge of the opening 11 of the vertical part 11a of the air conditioner duct 11 and are brought into engagement. As a result, the upper outlet tube 2 and the lower outlet tube 3 are firmly and turnably fitted onto the lower outlet tube 3 and the vertical part 11a of the air conditioner duct 11, respectively, and therefore, do not fall off easily.

Because, as mentioned above, the upper outlet tube 2 is turnably attached to the lower outlet tube 3 and the lower outlet tube 3 is turnably attached to the vertical part 11a of the air conditioner duct 11, cold/warm air can be blown out by turning the two air outlets 20,30 of the upper outlet tube 2 and lower outlet tube 3 in the air outlet assembly in desired two horizontal directions, respectively, and further, by manipulating the air-direction control knobs 24,34 to direct the vertical directions of the internal fins $21_1$–$21_3$,$31_1$–$31_3$ in desired directions, respectively. Incidentally, the manipulation of the air-direction control knobs 24,34 causes the central fins $21_2$,$31_2$ to turn about pivots on the brackets 22,32, and via the connecting rods 23,33 turnably attached to rear end portions of the central fins, their turning motions are transmitted to the upper and lower fins $21_1$,$21_3$,$31_1$,$31_3$ so that the fins are interlocked.

When the strong sunlight in midsummer impinges from the upper front, for example, the temperature in the closed cab 7 may rapidly rise into a state of scorching heat unless the air conditioner 8 is operated. The operator, therefore, turns on the air conditioner 8 to lower the temperature of air within the cab 7 with cold air blowing out of the fixed air conditioner ducts 12,13 and at the same time, directs the upper outlet tube 2 and lower outlet tube 3, which serve to perform direct blowing of cold air, toward himself and manipulates the air-direction control knobs 24,34 of the upper outlet tube 2 and lower outlet tube 3 to adjust the directions of cold air, for example, such that cold air is blown toward his face from the air outlet 20 of the upper outlet tube 2 and toward the knee region from the air outlet 30 of the lower outlet tube 3, respectively. This adjustment makes it possible to intensively cool parts of the body, against which the sunlight directly impinges in particular, so that the operator can be fully satisfied in connection with the air conditioning of the cab 7.

When the humidity is high as in the rainy season or the temperature is low as in winter, the front window 71 or the like of the cab 7 may be cooled to form dew on its inner surface so that it may be clouded. In such a case, the operator can perform demisting, for example, by directing the air outlet 30 of the lower outlet tube 3 toward the front window 71 or the like while keeping the air outlet 20 of the upper outlet tube 2 directed toward himself to make him feel cool. This applies equally when work is performed with the egress/ingress door kept open. Cold air w, which flows into the air outlet assembly 1 from the air conditioner duct 11, separates to the two air outlets, the air outlet 20 of the upper outlet tube 2 and the air outlet 30 of the lower outlet tube 3 and then blows out to the outside. As the volume ratio of the respective air flows is determined by the extents of tapering of the conical shapes which are formed by the circumferential walls of the upper outlet tube 2 and the lower outlet tube 3, the opening ratio of the air outlet 20 to the air outlet 30, the shape of an upper part of the upper outlet tube 2, and the like, the volume ratio of the respective air flows can be determined by setting these conditions as desired. According to the results of an experiment, setting of the volume ratio of air flows blown out of the upper and lower outlet tubes at 6 to 4 has been found to provide an operator with the best comfort.

In this embodiment, the circumferential walls on the sides of the air outlets 20,30 of the upper outlet tube 2 and lower outlet tube 3 are formed as tilted walls. This is to adequately set the above-mentioned air volume ratio and also to promote smooth flow of cold wind blowing out in an obliquely upward direction when the fins $21_1$–$21_3$,$23_1$–$23_3$ are directed upward. Further, the arrangement of the laterally-extending, disk-shaped, outer flange 2a and the inner flange 3a, which is fitted with the outer flange 2a, at the connecting part between the upper outlet tube 2 and the lower outlet tube 3 is to improve the attractiveness of the external appearance of the air outlet assembly 1, to make the upper outlet tube 2 and the lower outlet tube 3 turnable at the connecting part, to meet the need that their sliding portions have to be formed into circular shapes, and also to facilitate recognizing that the upper outlet tube 2 is turnable relative to the lower outlet tube 3.

In this embodiment, the connection between the upper outlet tube 2 and the lower outlet tube 3 and that between the lower outlet tube 3 and the vertical part 11a of the air conditioner duct 11 are realized by the locking structures making use of resilient deformations of projections of the claw portions 41,51 of the locking ring 4 and fitting ring 5, respectively. These connecting structures are merely illustrative, and any structures may be employed insofar as they perform a similar function. Further, the contour shapes of the upper outlet tube 2 and lower outlet tube 3 are in substantially cylindrical forms having conical circumferential walls. However, their counter shapes may be formed into desired shapes insofar as the connecting sliding portion between both of the outlet tubes and also that between the lower outlet tube 3 and the vertical part 11a of the air conditioner duct 11 are formed in circular shapes.

Figure 4B:
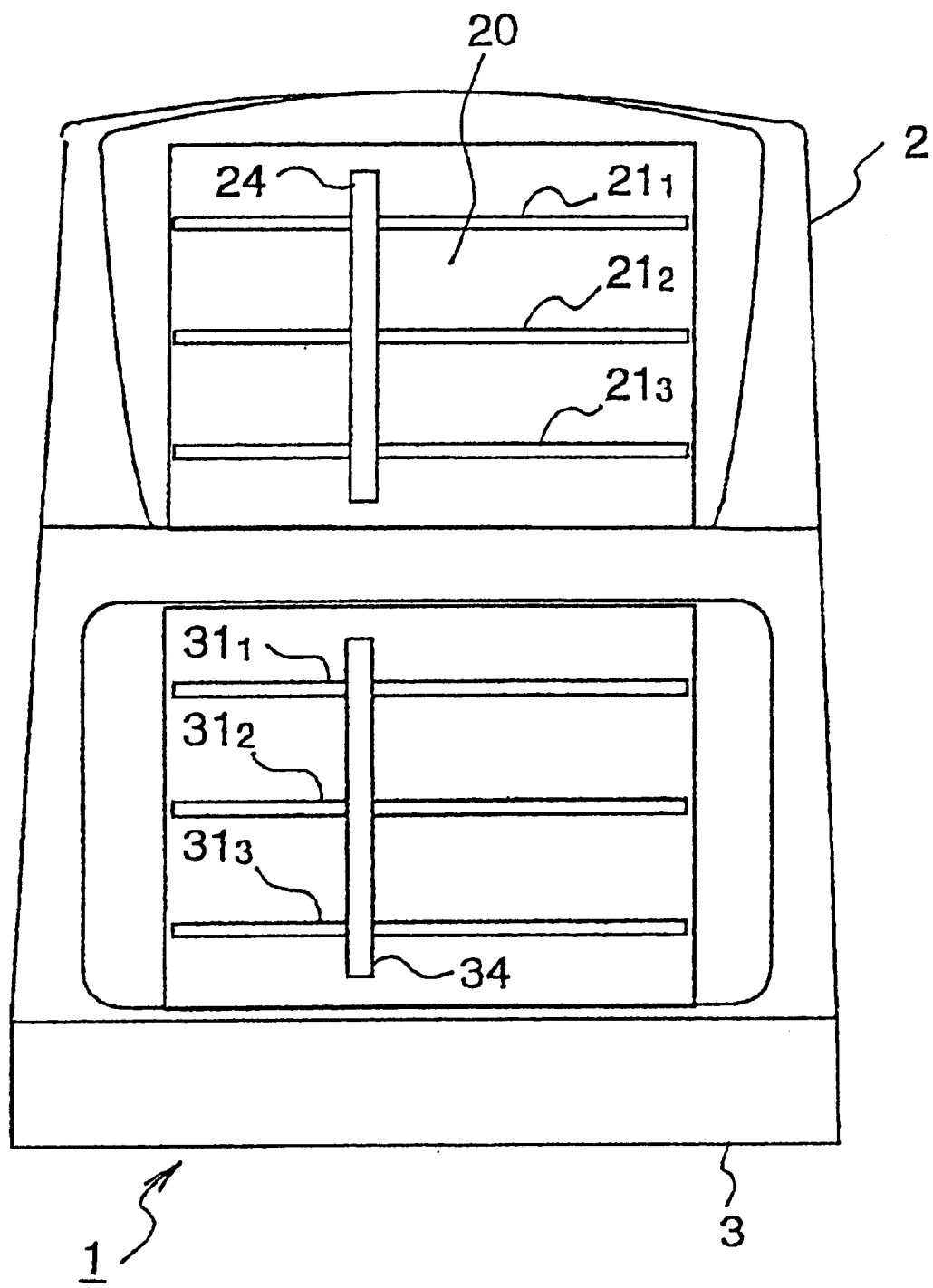
FIG. 4(b) is a front view (b)
Figure 4C:
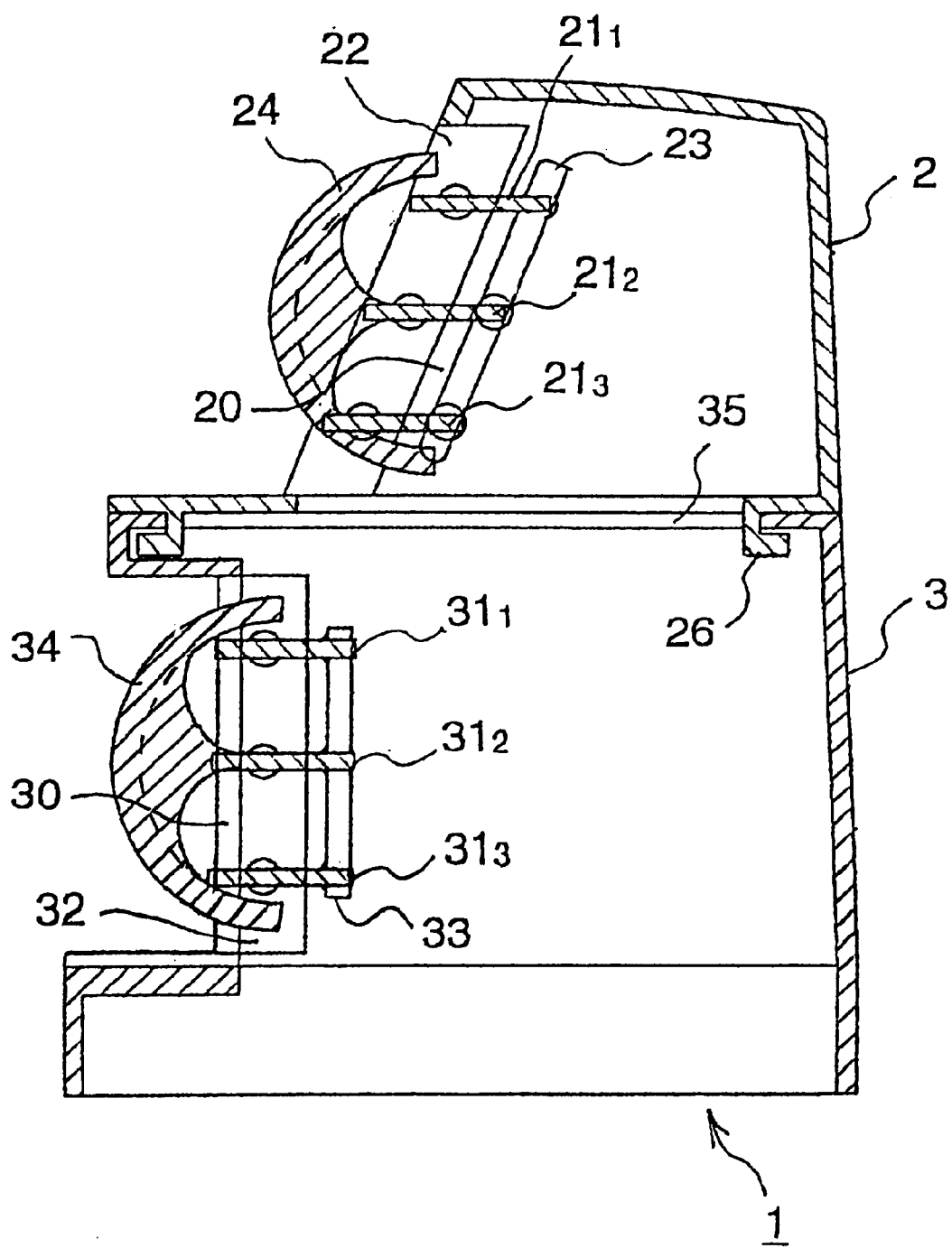
FIG. 4(c) is a cross-sectional view taken along line B—B.
Figure 5A:
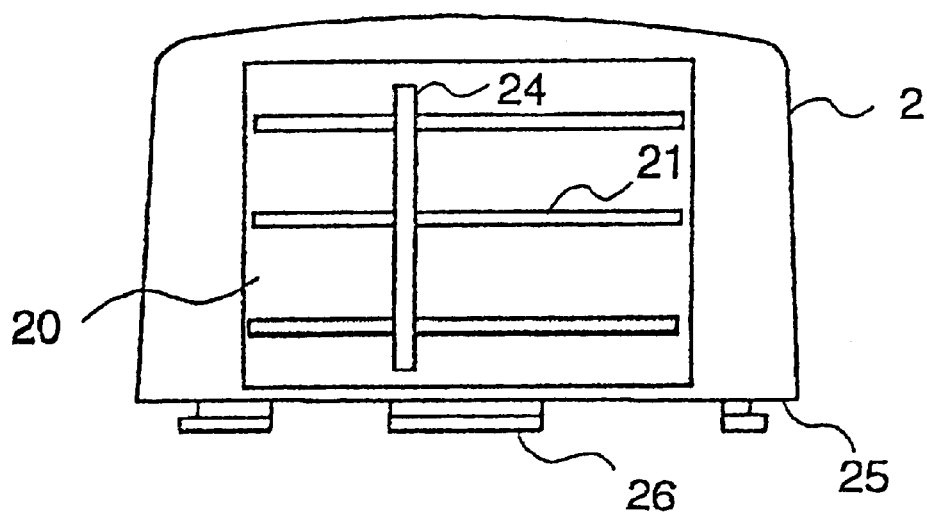
FIG. 5(a) is a front view and FIG. 5(b) is a bottom view.
Figure 5B:
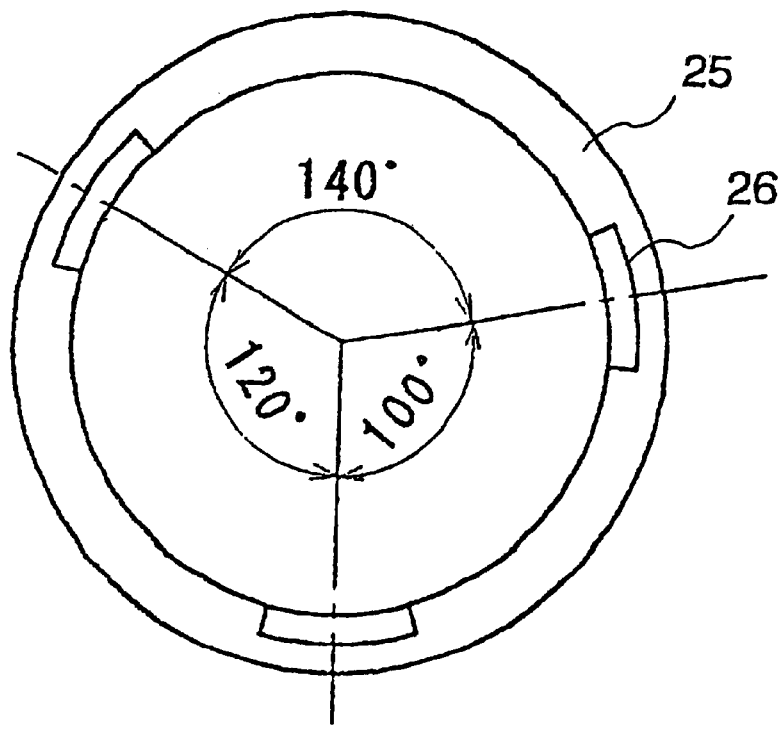

FIG. 4 includes the plan view (a) of the air outlet assembly 1 according to the second embodiment of the present invention arranged as an upper end part of the air conditioner duct 11, its front view (b) and its vertical cross-sectional view (c) taken along the cutting-plane line B—B in the plan view (a), FIG. 5 includes the front view (a) and bottom view (b) of the upper outlet tube 2, and FIG. 6 includes the plan view (a) and front view (b) of the lower outlet tube 3. These drawings illustrate a bottom wall 25 of the upper outlet tube 2; three legs 26 arranged on and extending from the bottom wall 25 of the upper outlet tube 2 at three locations adjacent to a circumferential edge of the bottom wall such that, as shown in FIG. 5(b), the three legs are arranged at non-equal angular intervals of from 100° to 140° and their free ends are formed as flat portions bent outward; a fitted opening 35 formed through an upper wall of the lower outlet tube 3 with such an inner diameter that the circumferential edge of the fitted opening remains in sliding contact with base portions of the three legs of the upper outlet tube 2; and three cut-off portions 35a formed in an inner circumferential portion of the fitted opening 35 at positions facing the three legs 26 of the upper outlet tube 2. In these drawings, elements of structure which are identical or can be considered identical to the corresponding elements of structure in the first embodiment are identified by like reference numerals and their repetitive descriptions will be omitted.

To complete the air outlet assembly 1, the upper outlet tube 2 is held on an upper part of the lower outlet tube 3. The upper outlet tube 2 and the lower outlet tube 3 are brought into angular registration such that the positions of arrangement of the three legs 26 arranged extending from the bottom wall 25 and the positions of arrangement of the three cut-off portions 35a formed in the inner circumferential portion of the fitted opening 35 in the lower outlet tube 3 precisely register with each other, and the upper outlet tube 2 is pressed into an upper part of the lower outlet tube 3. As a result, the legs 26 of the upper outlet tube 2 are fitted into the corresponding cut-of portions 35a of the lower outlet tube 3. Subsequent rotation of the upper outlet tube 2 over a predetermined angle brings upper surfaces of the flat portions of the legs 26 and a lower surface of the upper portion of the lower outlet tube 3 into sliding contact, and by the resulting frictional force, the upper outlet tube 2 is held at the rotated position. Even if the upper air outlet 2 is caused to turn relative to the lower outlet tube 3, the upper outlet tube 2, therefore, does not fall off from the lower outlet tube 3 as long as the positions of arrangement of the legs 26 on the upper outlet tube 2 and the positions of arrangement of the cut-off portions 35a in the lower outlet tube 3 are not brought into precise registration. As is appreciated from the foregoing, this embodiment makes it possible to simply and easily make the construction of the connecting part between the upper outlet tube 2 and the lower outlet tube 3, so that the assembly and disassembly work of the air outlet assembly 1 can be performed with extremely ease.

In this embodiment, the lower outlet tube 3 is in a substantially cylindrical form. Accordingly, its air outlet 30 is formed in a vertical wall rather than in a tilted wall. As the lower outlet tube 3 is in a substantially cylindrical form as mentioned above, its internal diameter can be dimensioned large compared with the upper outlet tube 2. This makes it possible to set relatively large the volume ratio of an air flow through the air outlet 30 of the lower outlet tube 3 to an air flow through the air outlet 20 of the upper outlet tube 2. Since the air outlet 30 of the lower outlet tube 3 is formed in the vertical circumferential wall, warm air can be effectively blown out, for example, when it is desired to blow out warm air intensively to the foot region of an operator. By suitably adjusting the shapes of the upper outlet tube 2 and lower outlet tube 3, the opening ratio of the air outlet 20 to the air outlet 30 and/or the like as mentioned above, the volume ratio of cold/warm air blown out through the air outlet 20 to that blown out through the air outlet 30 can be easily set.

Figure 7B:
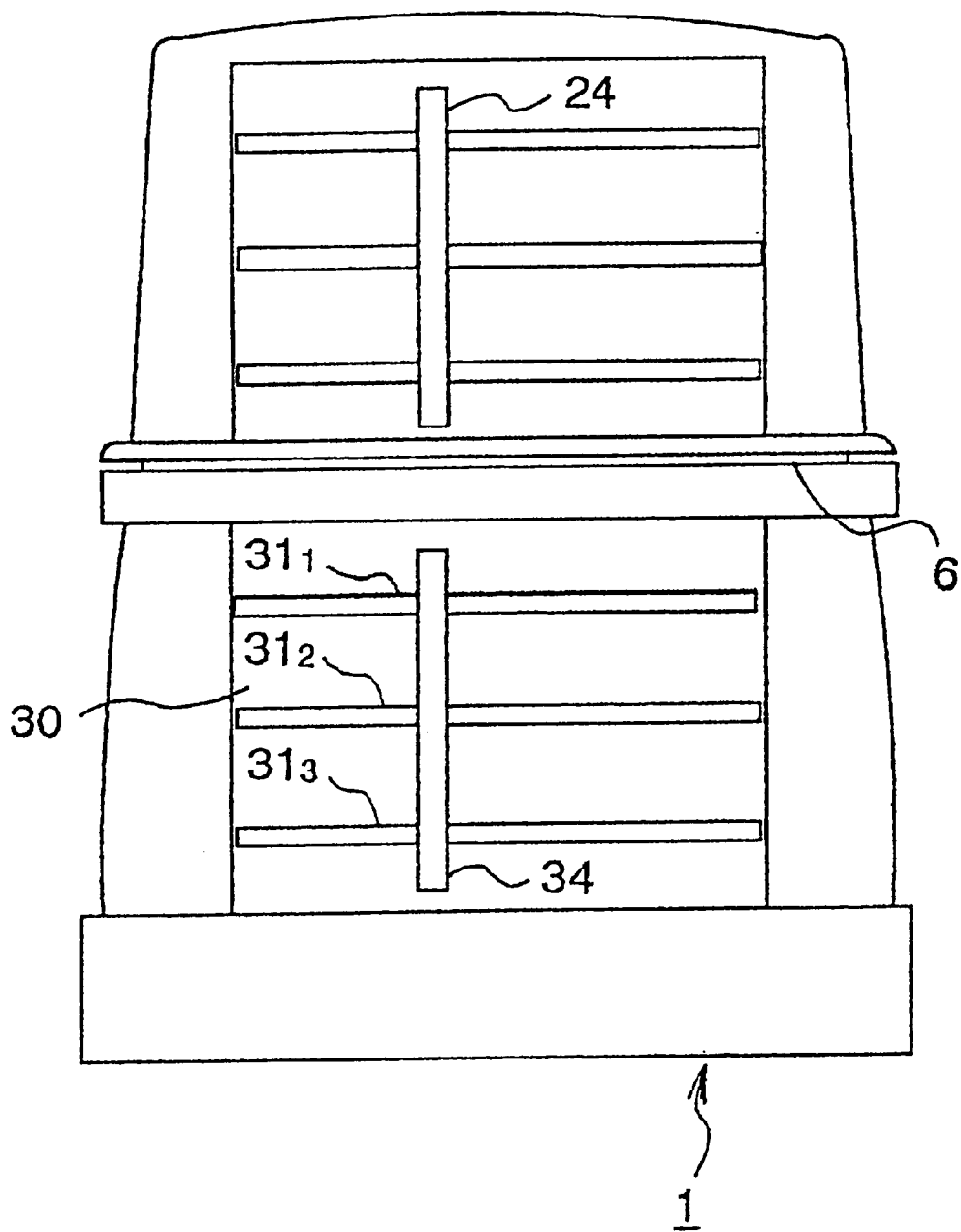
FIG. 7(b) is a front view.
Figure 7C:
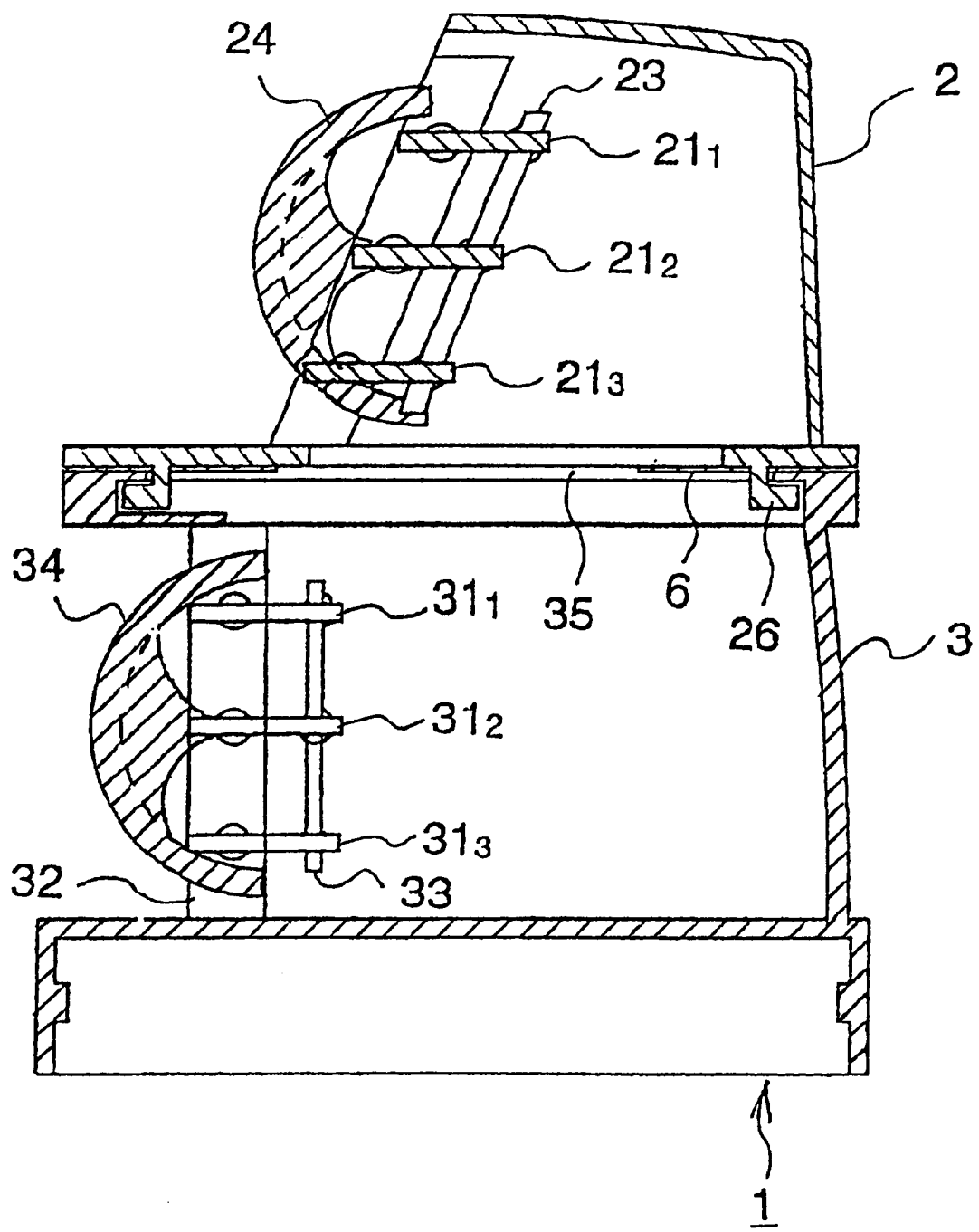
FIG. 7(c) is a cross-sectional view taken along line C—C.

FIG. 7 includes the plan view (a) of the air outlet assembly 1 according to the third embodiment of the present invention arranged as an upper end part of the air conditioner duct 11, which permits easy setting of a volume ratio of cold/warm wind blown out through an air outlet 20 to that blown out through an air outlet 30, its front view (b) and its vertical cross-sectional view (c) taken along the cutting-plane line C—C; and FIG. 8 includes the plan view (a) of the restrictor plate and the vertical cross-sectional view (b) taken along the cutting-plane line X—X. In these drawings, there are illustrated the restrictor plate (6) interposed between the upper outlet tube 2 and the lower outlet tube 3 to restrict the flow rate of cold/warm air from the lower outlet tube 3 to the upper outlet tube 2 in accordance with the area of its opening; three cut-off portions 6a formed in an outer circumferential portion of the restrictor plate 6 at three locations facing three legs 26 on the upper outlet tube 2; and an air-volume-adjusting restricted hole 6b centrally formed in a concentric form through the restrictor plate 6.

This embodiment is considerably different from the second embodiment in that the restrictor plate 6 is interposed between the upper outlet tube 2 and the lower outlet tube 3. To complete the air outlet assembly 1, the upper outlet tube 2 is held upside down to make the bottom wall 25 face upward, and the restrictor plate 6 is then held on the bottom wall 25. The restrictor plate 6 is brought into angular registration such that the positions of arrangement of the three legs 26, which extend upright on the bottom wall 25 of the upper outlet tube 2, and the positions of arrangement of the three cut-off portions 6a formed in the outer circumferential portion of the restrictor plate 6 precisely register with each other to have the restrictor plate 6 fitted on the legs 26 of the upper outlet tube 2. Subsequently, the upper outlet tube 2 is connected with the lower outlet tube 3 in the same manner as the manner mentioned above with respect to the former embodiment. Advance provision of plural restrictor plates 6 different in the restricted hole 6b permits performing an adjustment to a desired air volume ratio without making changes to the shapes or the like of the upper outlet tube 2 and lower outlet tube 3 by simply selecting one of the restrictor plates 6, which is suited for a desired air volume ratio, and assembling it in the air outlet assembly 1.

Figure 9A:
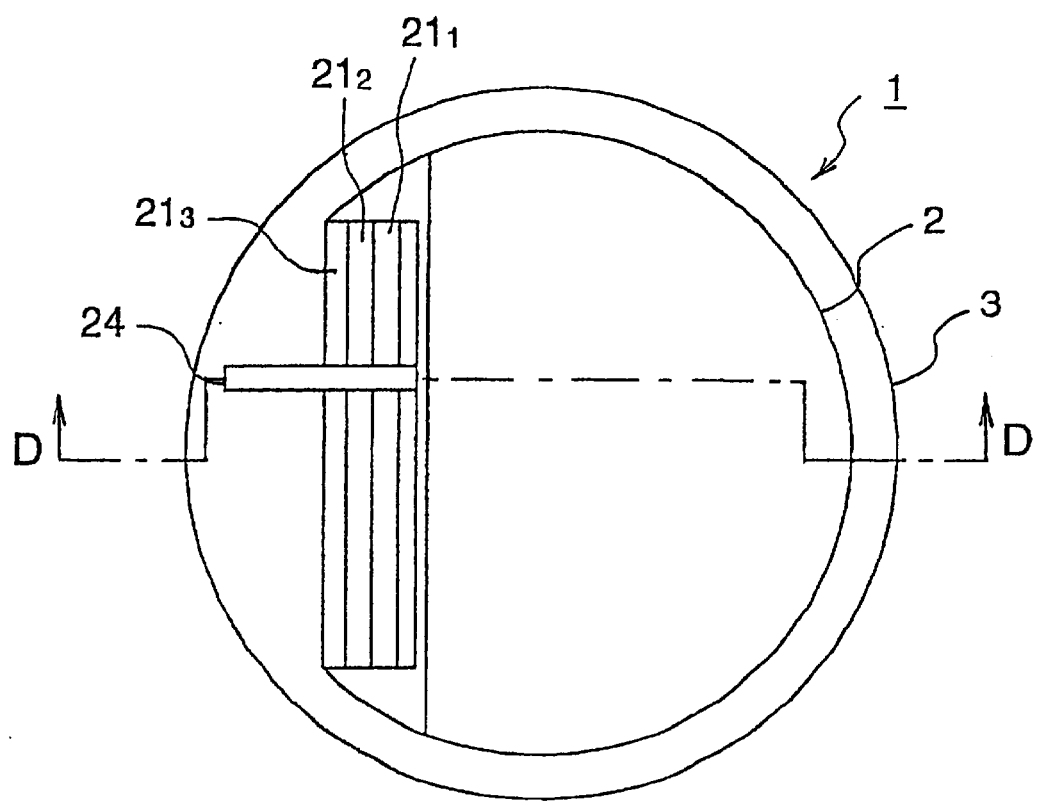
FIG. 9(a) is a plan view.
Figure 9B:
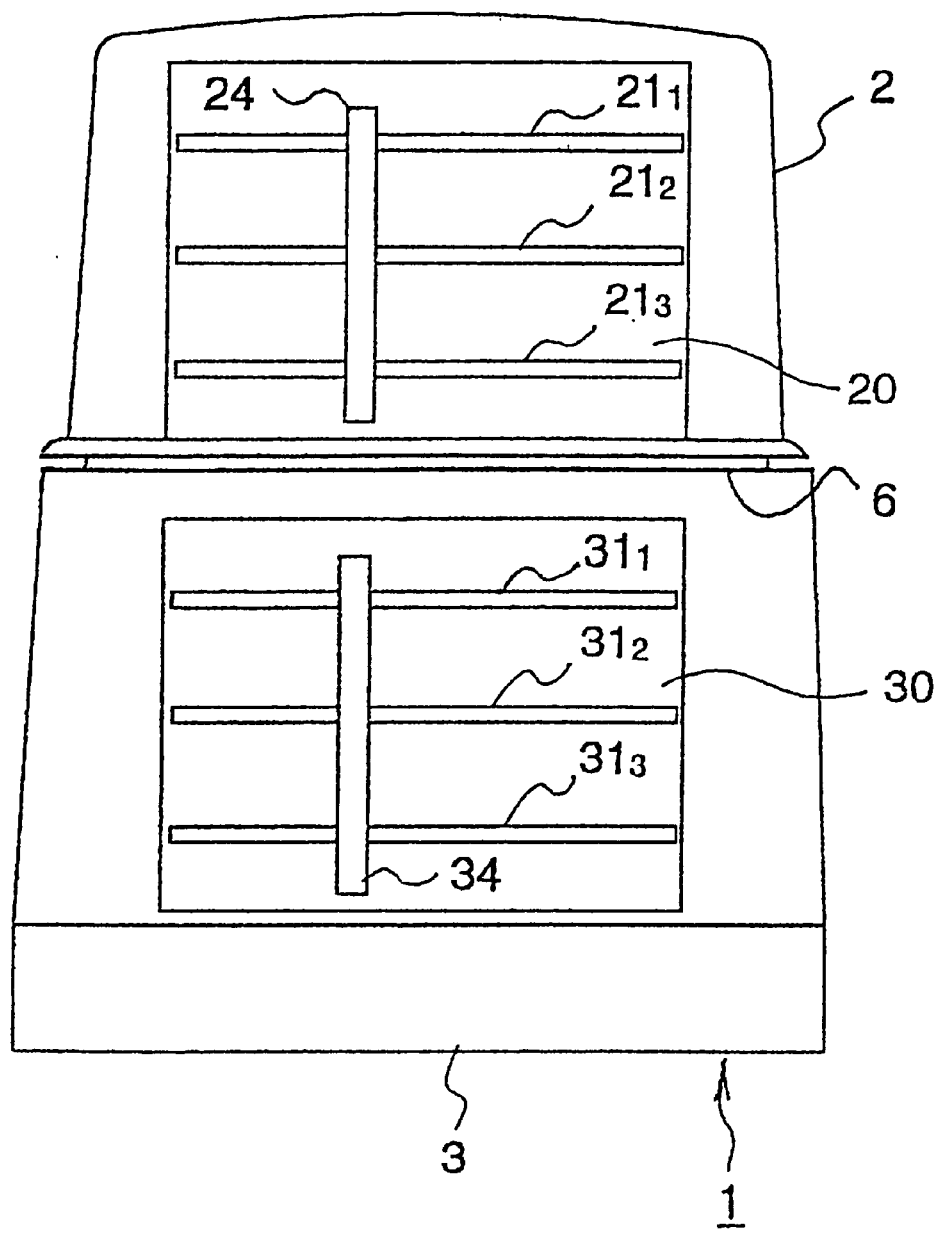
FIG. 9(b) is a front view.
Figure 9C:
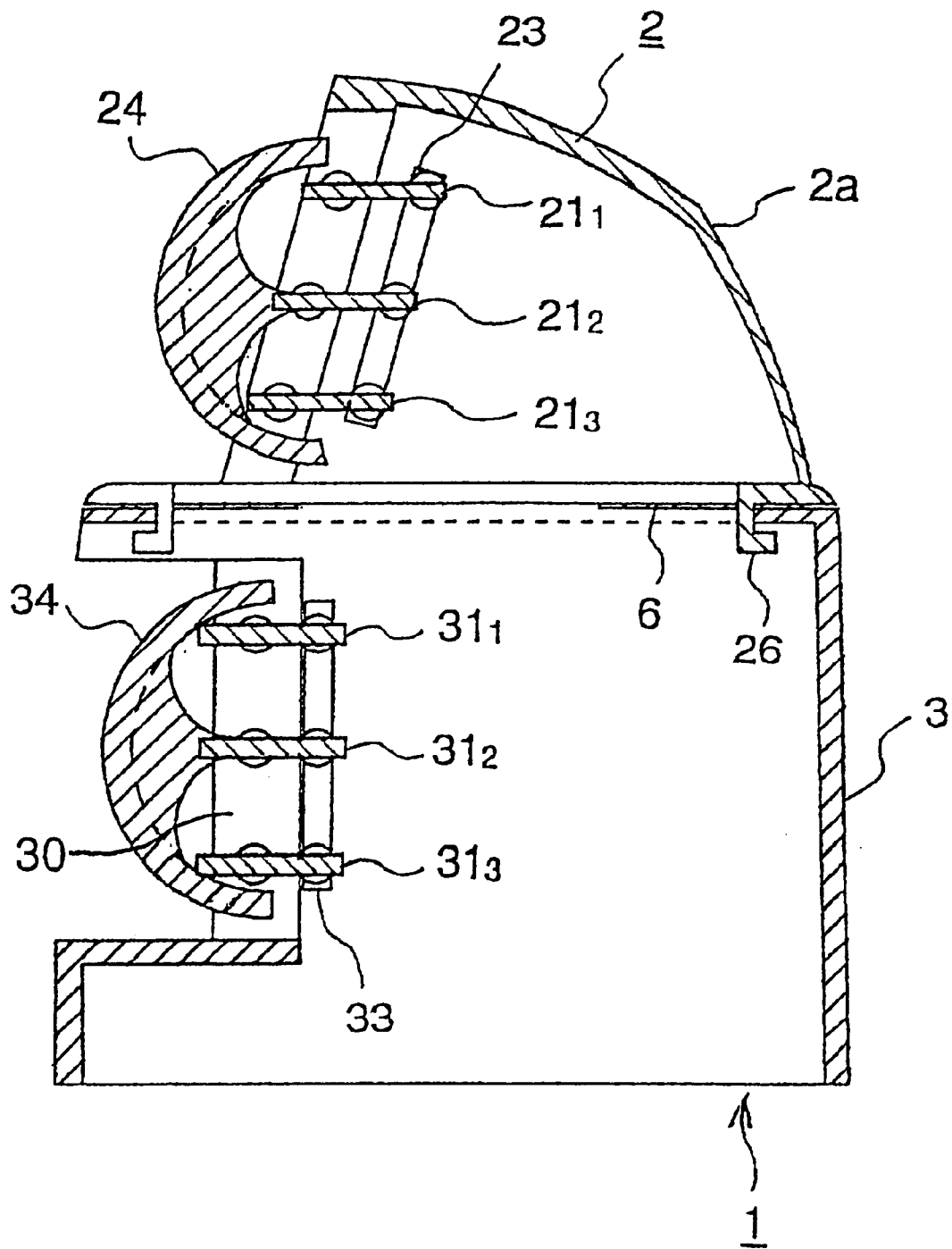
FIG. 9(c) is a cross-sectional view taken along line D—D.

FIG. 9 includes the plan view (a) of the air outlet assembly 1 according to the fourth embodiment of the present invention arranged as an upper end part of the air conditioner duct 11, its front view (b), and its cross-sectional view taken along cutting-plane line D—D in the plan view (a). In FIG. 9(c), sign 2a designates a curved rear wall which forms a gently curved surface in an upper outlet tube 2. This embodiment is different from the third embodiment in that an upper outlet tube 2 is provided at an upper rear part thereof with this curved wall. In this embodiment, the rear part of the upper outlet tube 2 is formed as the curved rear wall 2a which presents the gently curved surface. A flow or cold/warm air, which has blown upward through the vertical part 11a of the air conditioner duct 11, can hence be smoothly changed by the curved rear wall 2a into a flow of cold/hot air that blows forward.

Figure 10A:
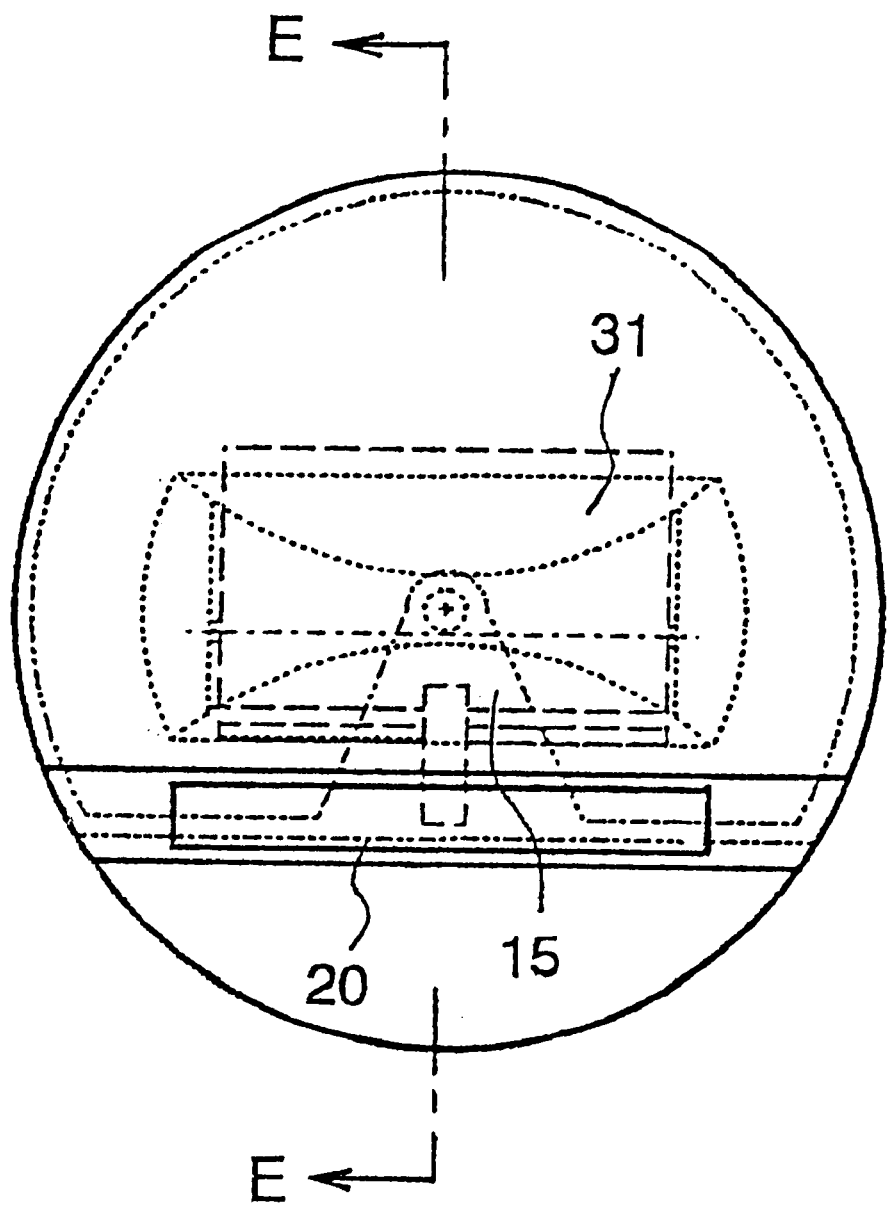
FIG. 10(a) is a plan view.
Figure 10B:
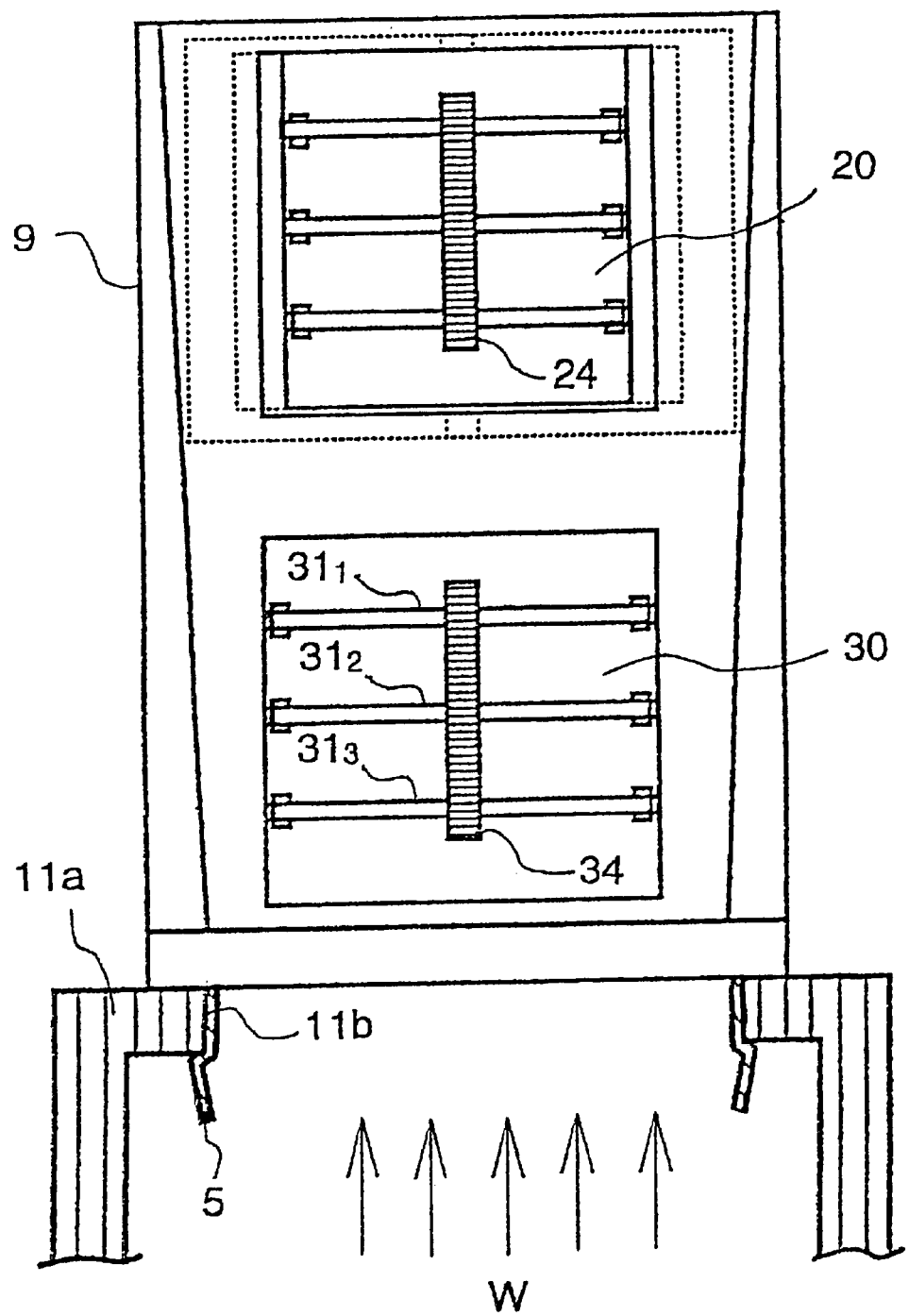
FIG. 10(b) is a front view.
Figure 10C:
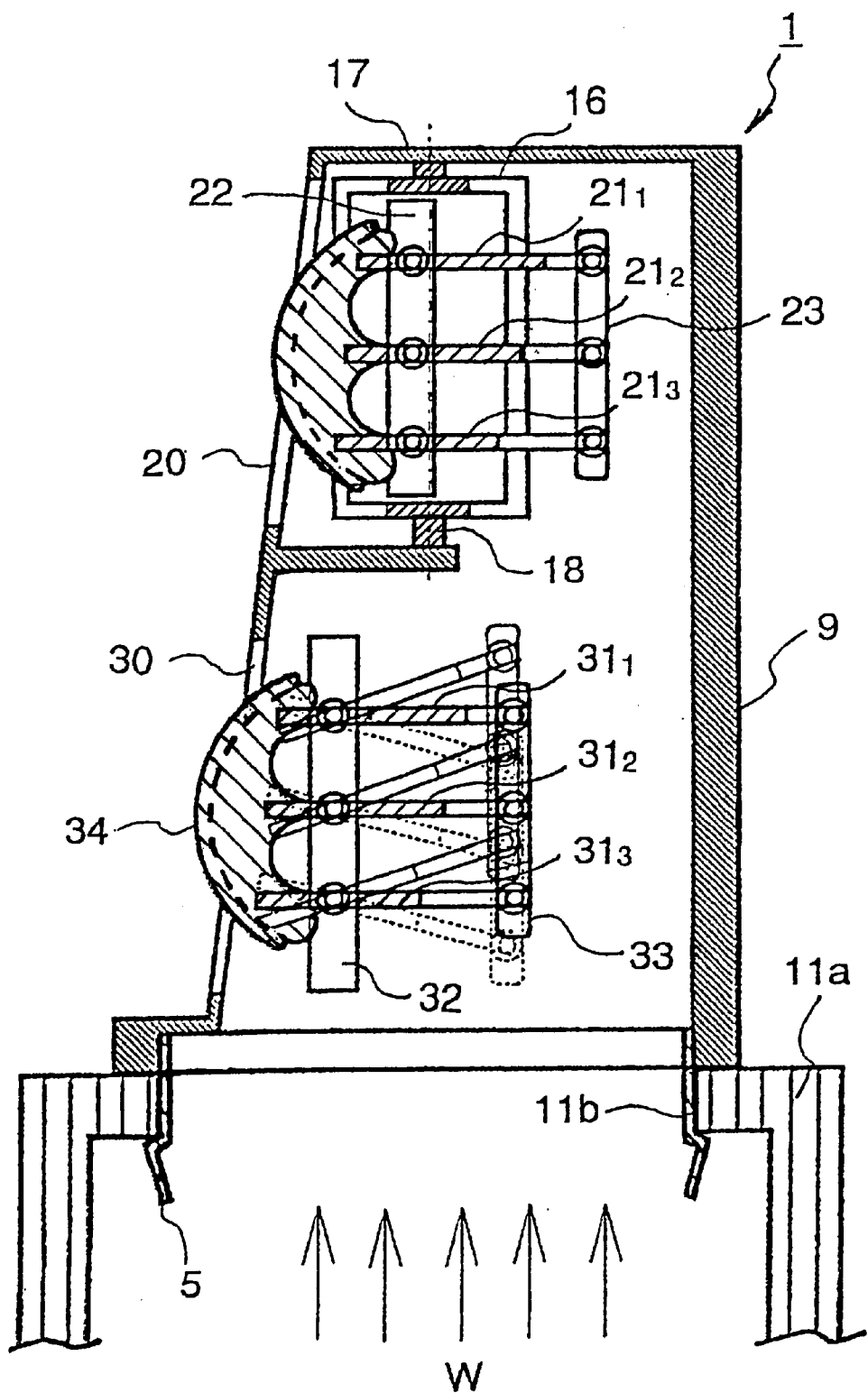
FIG. 10(c) is a cross-sectional view taken along line E—E.

FIG. 10 includes the plan view (a) of the air outlet assembly 1 according to a fifth embodiment of the present invention arranged as an upper end part of the air conditioner duct 11, its front view (b), and its cross-sectional view taken along cutting-plane line E—E. These drawings depict an outlet tube 9 making up an air outlet assembly 1 by a single casing; a semicircular support collar 15 arranged on a front side, in a substantially central part as viewed in a vertical direction, within the outlet tube 9 with a front edge thereof integrally fixed on an inner circumferential wall of the outlet tube 9; a box-shaped case 16 supporting on both left and right sides thereof a pair of brackets 22 at their upper end portions and lower end portions, and supported turnably in a horizontal direction; and support pins 17,18 arranged extending from central parts of an upper and lower walls of the box-shaped case 16 and turnably supported on a top wall of the outlet tube 9 and the upper surface of the support collar 15, respectively. Like the lower outlet tube 3 in the first embodiment, claw portions 51 of a fitting ring 5 which is fixedly adhered on an inner circumferential surface of a lower part of the outlet tube 9 are fitted in the opening 11b of the vertical part 11a of the air conditioner duce 11, so that by projections of the claw portions 51, the outlet tube 9 is fitted turnably in a horizontal direction.

As the upper and lower air outlets 20,30 are both formed in the front wall of the single outlet tube 9 in this embodiment, the horizontal directions of cold/warm air blown out of the air outlets 20,30 are basically the same as the directions in which the air outlets 20,30 are directed. It is, however, to be noted that the box-shaped case 16 is turnable in a horizontal direction owing to the provision of the support pins 17,18. Therefore, the direction of cold/warm air, which blows out of the air outlet 20 after flowing through the box-shaped case 16, can be changed to certain extent in a leftward or rightward direction depending upon the horizontal direction of the box-shaped case 16. In this embodiment, fins which are arrayed in a vertical direction are not attached to the box-shaped case 16. If such vertically arrayed fins are attached to the box-shaped, however, a change in the direction of cold/warm air, which blows out of the air outlet 20, depending upon the horizontal direction of the box-shaped case 16 will become more pronounced. As is appreciated from the foregoing, this embodiment also allows to change the directions of cold/warm air, which blows out of the upper and lower air outlets 20,30, in both. horizontal and vertical directions by adjusting the turned position of the outlet tube 9, the turned position of the box-shaped case 16 and the vertical directions of the fins $21_1$–$21_3$,$31_1$–$31_3$ as desired.

Figure 11:
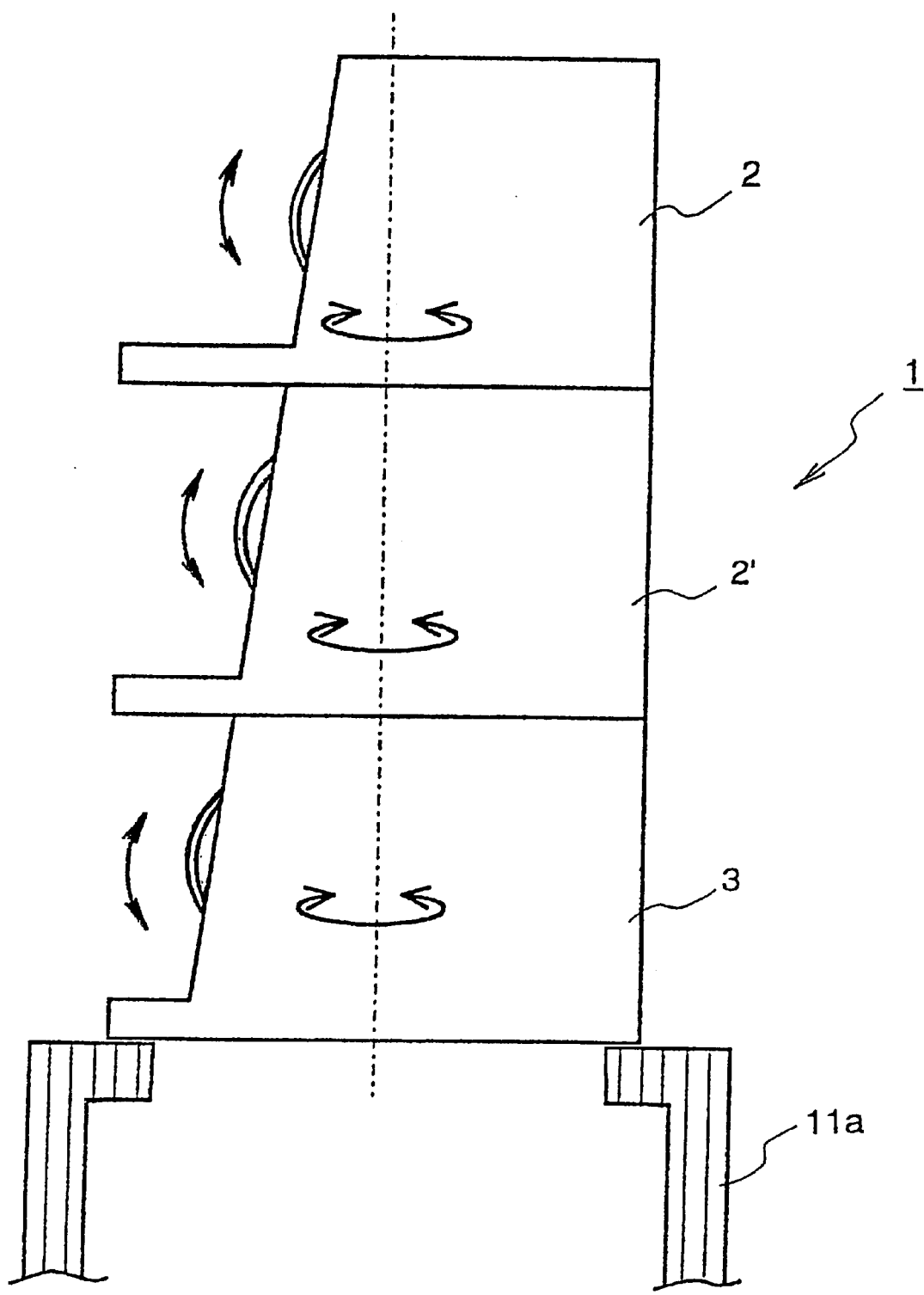
FIG. 11 is a drawing schematically illustrating an air outlet assembly according to a sixth embodiment of the present invention.

FIG. 11 is the schematic view of the air outlet assembly 1 according to the sixth embodiment of the present invention arranged as an upper end part of the air conditioner duct 11. In the drawing, numeral 2' designates a middle outlet tube, which is interposed between an upper outlet tube 2 and a lower outlet tube 3 and has a substantially similar shape as the upper outlet tube 2. As apparent from the drawing, this embodiment is characterized in that the three outlet tubes are arranged into a stacked structure. Owing to the adoption of such a structure, the number of outlets for cold/warm air, each of said outlets being capable of changing the direction of cold/warm air in both horizontal and vertical directions, can be increased by one to three. It is, therefore, possible to intensively cool or warm a greater number of places or regions. Needless to say, the number of stacked outlet tubes can be increased further.

Figure 15:
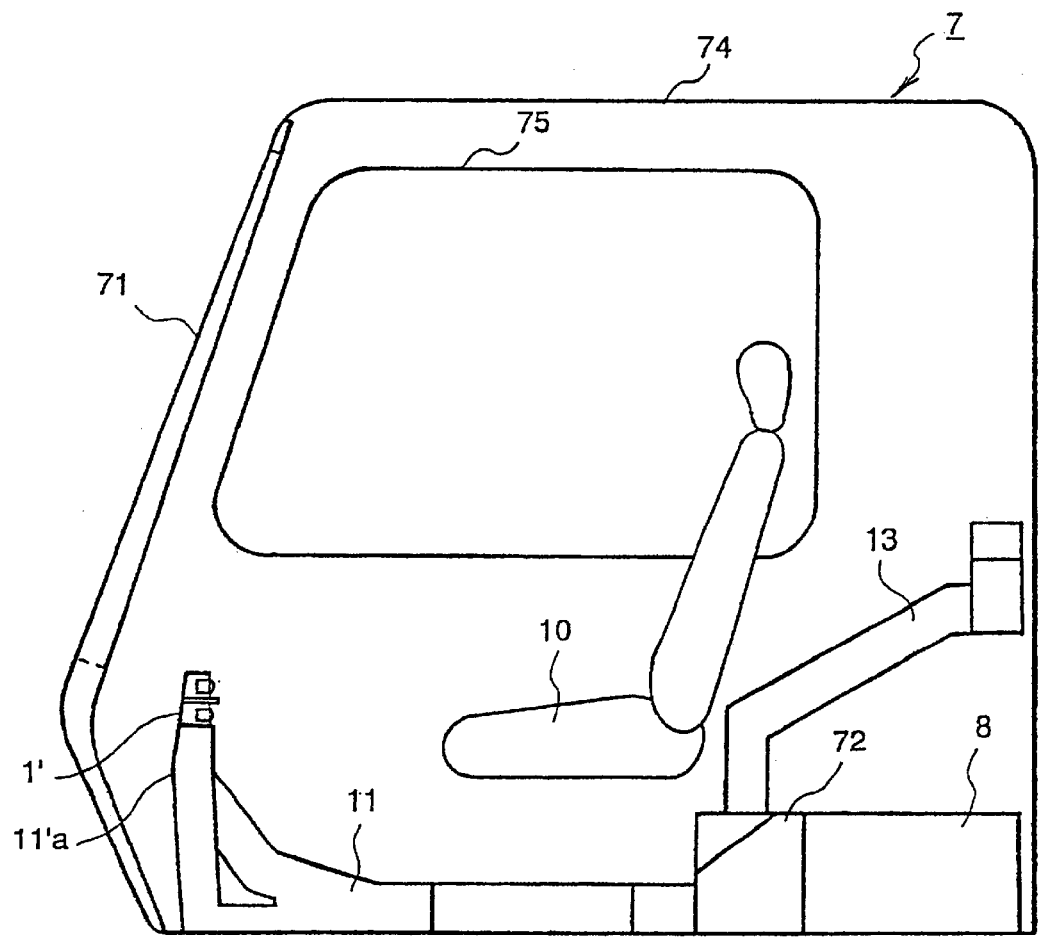
FIG. 15 is a side view illustrating an air conditioner in a cab of a hydraulic excavator, to which a seventh embodiment of the present invention has been applied.

FIG. 15 and FIG. 16 are the side view and plan view, in each of which the air conditioner in the cab of the hydraulic excavator, to which the seventh embodiment of the present invention has been applied, is observed in a see-through fashion. These drawings illustrate an air outlet assembly 1' arranged in a front left corner of the cab 7 at a position laterally symmetrical with the air outlet assembly 1 and having the same shape as the air outlet assembly 1; and a vertical part 11a' branched out from a rising part of the air conditioner duct 11, extending along a lower front end of the cab 7, rising in a vertical direction in the front left corner and arranged at a position laterally symmetrical with the vertical part 11a. As the air outlet assembly 1' is additionally arranged in the front left corner of the cab 7 at the position laterally symmetrical with the air outlet assembly 1 as described above, this embodiment is doubled in the number of air outlet assemblies and can blow cold/warm air from different directions against an operator to cool or warm the operator evenly on both left and right sides.

Industrial Applicability

As has been described above, according to the present invention, a plurality of air outlets are arranged in a vertical direction of a casing, and directions of cold/warm air blowing out of the respective air outlets can be independently set in a vertical direction and a horizontal direction. Therefore, the cold/warm air—which blows out of the upper and lower air outlets, respectively—can be set in desired vertical and horizontal directions, thereby making it possible to fully meet desires on the comfort of a working environment of an operator under air conditioning and use of air conditioning for a multiplicity of purposes.

According to the present invention, the circumferential wall of the casing may be constructed of a conical or upwardly tapered tubular member. Therefore, the ratio of volumes of cold/warm air which blows out of the respective air outlets, can be set at a desired value by suitably setting the tapered shape of the casing.

According to the present invention, the casing may comprise a plurality of small casings stacked in the vertical direction such that the small casings are slidingly turnable in a horizontal direction relative to each other, and the small casings may each be provided with at least one air outlet formed therethrough. Therefore, the horizontal blowing directions of cold/warm air can be changed to desired directions by the simple construction.

According to the present invention, with respect to each air outlet, plural fins may be arranged turnably about a horizontal rod and may be interlocked by a connecting member which connects the fins together. Therefore, cold/warm air which blows out of each air outlet is allowed to flow out as a laminar flow.

According to the present invention, a restrictor may be interposed on an upstream side of one of the air outlets, said one air outlet being located on a downstream side, to control a flow rate of cold/warm air. Therefore, the ratio of a flow rate of cold/warm air on an upstream side of the restrictor to a flow rate of cold/warm air on a downstream side of the restrictor can be easily adjusted.

According to the present invention, at least one of the air outlets may be formed through an upwardly-directed, tilted wall which forms at least a part of the circumferential wall of the casing. Therefore, cold/warm air which blows out of the air outlet can flow out smoothly.

What is claimed is:

1. A cold/warm air outlet assembly for a construction machine, said assembly including a casing for being arranged on a vertical part of an air conditioner duct arranged in a cab such that said vertical part extends upwardly in a front corner section of said cab to guide a cold/warm air supplied from an air conditioner, an air outlet formed in a circumferential wall of said casing and capable of allowing said cold/warm air to blow out in a sideward direction, and fins arranged in said air outlet turnably at least about a horizontal rod to cause said cold/warm air to blow out in a desired direction, characterized in that a plurality of air outlets as defined above are arranged in a vertical direction of said casing, and directions of cold/warm air blowing out of said respective air outlets can be independently set in a vertical direction and a horizontal direction.

2. A cold/warm air outlet assembly according to claim 1, wherein said circumferential wall of said casing is constructed of a conical or upwardly tapered tubular member.

3. A cold/warm air outlet assembly according to claim 1, wherein said casing comprises a plurality of small casings stacked in said vertical direction such that said small casings are slidingly turnable in a horizontal direction relative to each other, and said small casings are each provided with at least one air outlet formed therethrough.

4. A cold/warm air outlet assembly according to claim 1, wherein with respect to each air outlet, plural fins as defined in claim 1 are arranged turnably about a horizontal rod, and are interlocked by a connecting member which connects said fins together.

5. A cold/warm air outlet assembly according to claim 1, wherein a restrictor is interposed on an upstream side of one of said air outlets, said one air outlet being located on a downstream side, to control a flow rate of said cold/warm air.

6. A cold/warm air outlet assembly according to claim 1, wherein at least one of said air outlets is formed through an upwardly-directed, tilted wall which forms at least a part of said circumferential wall of said casing.

* * * * *